United States Patent
Okayama

(10) Patent No.: US 10,511,503 B2
(45) Date of Patent: Dec. 17, 2019

(54) SERVER DEVICE AND COMMUNICATION SYSTEM

(71) Applicant: FUJITSU LIMITED, Kawasaki-shi, Kanagawa (JP)

(72) Inventor: Shigeyuki Okayama, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/032,904

(22) Filed: Jul. 11, 2018

(65) Prior Publication Data
US 2018/0324067 A1 Nov. 8, 2018

Related U.S. Application Data

(63) Continuation of application No. PCT/JP2016/051050, filed on Jan. 14, 2016.

(51) Int. Cl.
*H04L 12/26* (2006.01)
*H04W 24/10* (2009.01)
(Continued)

(52) U.S. Cl.
CPC .......... *H04L 43/065* (2013.01); *H04L 43/062* (2013.01); *H04W 24/10* (2013.01); *H04W 88/04* (2013.01); *H04B 7/15* (2013.01)

(58) Field of Classification Search
None
See application file for complete search history.

(56) References Cited

U.S. PATENT DOCUMENTS

| | | | |
|---|---|---|---|
| 2008/0155064 A1* | 6/2008 | Kosuge | E03F 7/00 709/219 |
| 2010/0035615 A1* | 2/2010 | Kitazoe | H04W 48/02 455/436 |

(Continued)

FOREIGN PATENT DOCUMENTS

| | | | |
|---|---|---|---|
| JP | 2000022719 A | 1/2000 | |
| JP | 2004302960 A | 10/2004 | |

(Continued)

OTHER PUBLICATIONS

International Search Report for PCT/JP2016/051050 dated Mar. 22, 2016.

*Primary Examiner* — Phirin Sam
(74) *Attorney, Agent, or Firm* — Maschoff Brennan

(57) ABSTRACT

A server device includes a memory, a processor, and a transceiver. The memory stores information indicating a measurement device and information indicating a relay device in association with identification information of the terminal, the measurement device performing measurement to obtain measurement data, the relay device being able to relay the measurement data to the server device. The processor generates a report packet destined for a relay device, the report packet reporting a list of a measurement device that is a transmission source of measurement data to be relayed by the relay device. When the transceiver receives a request that the use of the services in the terminal be stopped, the processor generates a report packet destined for a relay device associated with the identification information of the terminal, the report packet including the list in which a measurement device associated with the identification information of the terminal is not included.

12 Claims, 16 Drawing Sheets

(51) Int. Cl.
*H04W 88/04* (2009.01)
*H04B 7/15* (2006.01)

(56) References Cited

U.S. PATENT DOCUMENTS

| | | | |
|---|---|---|---|
| 2010/0080206 A1 | 4/2010 | Yamada | |
| 2010/0265842 A1* | 10/2010 | Khandekar | H04W 72/0433 370/252 |
| 2013/0310077 A1* | 11/2013 | Siomina | H04W 64/00 455/456.2 |
| 2014/0226658 A1* | 8/2014 | Kakadia | H04L 43/0882 370/389 |
| 2014/0325019 A1* | 10/2014 | Austin | H04L 41/06 709/217 |
| 2015/0312788 A1* | 10/2015 | Delsol | H04W 84/047 370/252 |
| 2016/0352852 A1* | 12/2016 | Yamamoto | H04L 12/6418 |
| 2017/0127303 A1* | 5/2017 | Austin | H04L 41/06 |

FOREIGN PATENT DOCUMENTS

| | | | |
|---|---|---|---|
| JP | 2007158439 A | 6/2007 | |
| JP | 2010049560 A | 3/2010 | |
| JP | 2014186526 A | 10/2014 | |
| WO | 2008102755 A1 | 8/2008 | |

* cited by examiner

| USER ID | USER 1 | USER 2 |
|---|---|---|
| TERMINAL ID | phon1 | sumaho2 |
| RELAY DEVICE ID | St1 | St2 |
| MEASUREMENT DEVICE ID | N1 | N2 |

56_1

41a_1

41c

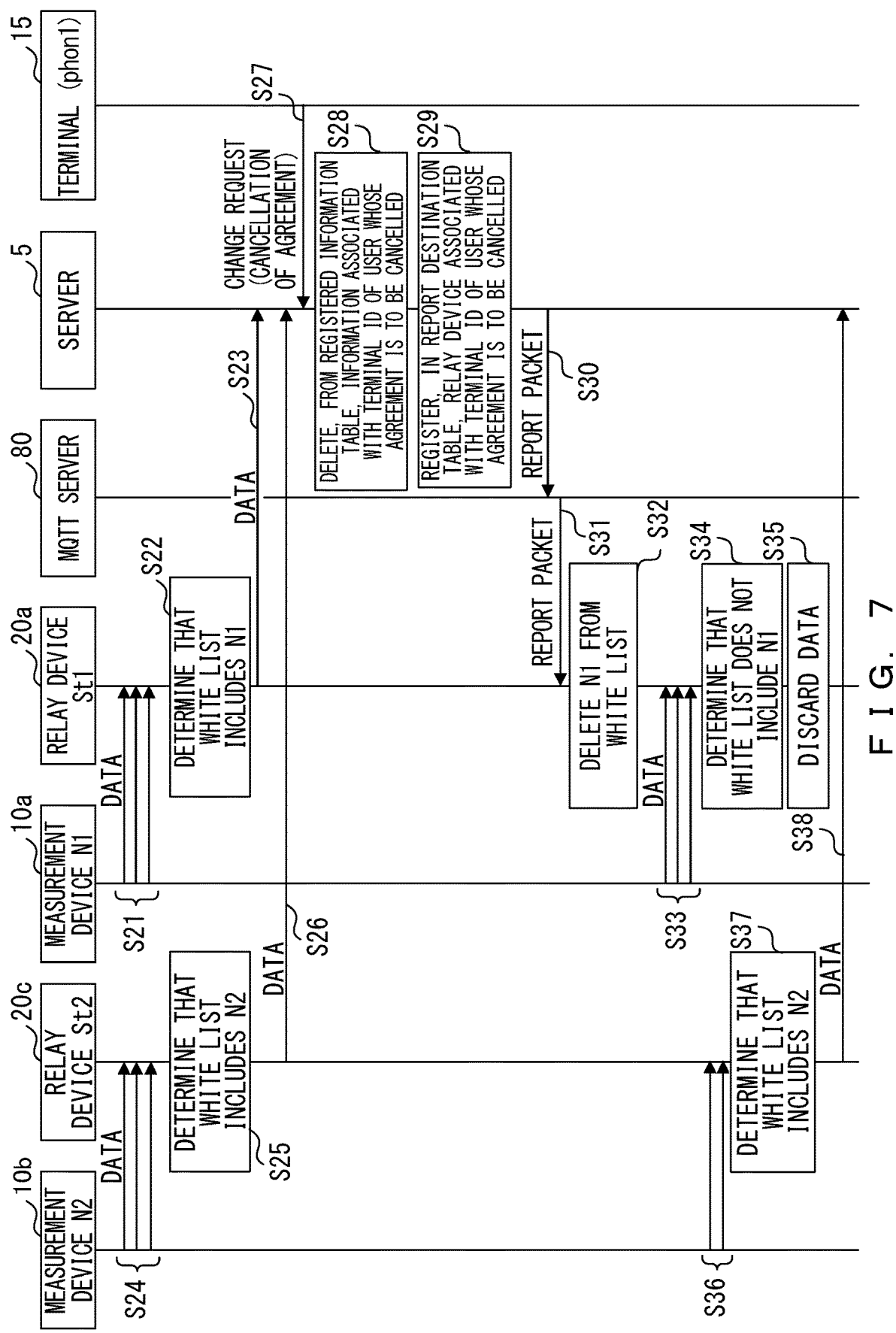
F I G. 7

56_2

| USER ID | USER 2 |
|---|---|
| TERMINAL ID | sumaho2 |
| RELAY DEVICE ID | St2 |
| MEASUREMENT DEVICE ID | N2 |

57_1

| REPORT DESTINATION RELAY DEVICE ID | ID OF MEASUREMENT DEVICE TO BE REPORTED |
|---|---|
| St1 | N/A |

| ID OF MEASUREMENT DEVICE THAT IS TRANSMISSION SOURCE OF DATA TO BE RELAYED | 41a_2 |
|---|---|
| — | |

F I G. 8

56_3

| USER ID | USER 1 |
|---|---|
| TERMINAL ID | phon1 |
| RELAY DEVICE ID | St1 |
| MEASUREMENT DEVICE ID | N1 |

41a_3

| ID OF MEASUREMENT DEVICE THAT IS TRANSMISSION SOURCE OF DATA TO BE RELAYED |
|---|
| N1 |

41d_1

| ID OF MEASUREMENT DEVICE THAT IS TRANSMISSION SOURCE OF DATA TO BE RELAYED |
|---|
| — |

F I G. 9

56_4

| USER ID | USER 1 |
|---|---|
| TERMINAL ID | phon1 |
| RELAY DEVICE ID | St1<br>St3 |
| MEASUREMENT DEVICE ID | N1 |

57_2

| REPORT DESTINATION RELAY DEVICE ID | ID OF MEASUREMENT DEVICE TO BE REPORTED |
|---|---|
| St1 | N1 |
| St3 | N1 |

41d_2

| ID OF MEASUREMENT DEVICE THAT IS TRANSMISSION SOURCE OF DATA TO BE RELAYED |
|---|
| N1 |

FIG. 11

| | 56_5 |
|---|---|
| USER ID | USER 1 |
| TERMINAL ID | phon1 |
| RELAY DEVICE ID | St1 |
| MEASUREMENT DEVICE ID | N1<br>N3 |

| REPORT DESTINATION RELAY DEVICE ID | ID OF MEASUREMENT DEVICE ID TO BE REPORTED |
|---|---|
| St1 | N1<br>N3 |

57_3

| ID OF MEASUREMENT DEVICE THAT IS TRANSMISSION SOURCE OF DATA TO BE RELAYED |
|---|
| N1<br>N3 |

SERVER DEVICE AND COMMUNICATION SYSTEM

CROSS-REFERENCE TO RELATED APPLICATION

This application is a continuation application of International Application PCT/JP2016/051050 filed on Jan. 14, 2016 and designated the U.S., the entire contents of which are incorporated herein by reference.

FIELD

The embodiments discussed herein are related to a server device, a communication system, and a communication program.

BACKGROUND

Due to the widespread use of communication equipment, IoT (Internet of things) in which various devices are connected to a network so as to perform communication has attracted attention, and systems that provide various services have been devised. For example, a remote monitoring system may be provided by causing various devices connected to a network to communicate with an application server. For example, in the remote monitoring system, a measurement device that has a measurement function such as a sensor is provided near a monitoring target. The measurement device uploads an obtained measurement result to the application server as needed. The application server transmits obtained measurement data to communication equipment, such as a cell phone, a tablet, or a computer, used by a user. When the communication equipment used by the user receives the measurement data from the application server, the user confirms the measurement data as needed using, for example, an application. For example, when information such as humidity and temperature around a monitoring target of the monitoring system is measured by a sensor included in the measurement device, the information such as humidity and temperature around the monitoring target of the monitoring system is reported to the application server. When the communication equipment used by the user receives data such as humidity or temperature from the application server, the user confirms an obtained measurement result using the communication equipment. The system using IoT may be any system other than a remote monitoring system.

As a related technology, a system in which an observation station that includes a sensor transmits/receives meta data or sensor data to/from a server is known, the meta data or the sensor data being data about, for example, a connection of a sensor, an observation method, and a sensor data distribution. Further, a system has also been devised that includes an adaptor that is associated with a controlled device that is controlled by an integrated control device, in which screen information or a communication procedure used to control the controlled device is provided to the adaptor. In this system, the information provided to the adaptor is transferred to the integrated control device, so the setting in the integrated control device will remain unchanged even if the control procedure of the controlled device is changed. Furthermore, a method in which a gateway that receives a router request message from a sensor node specifies a service server using the received message; obtains, from the service server, information that is to be set in the sensor node; and transmits the information to the sensor node has also been proposed. Moreover, a method for controlling an event transfer on the basis of a result of comparing a hop attribute of an event received by an entity device with a hop attribute of a filter registered in a router that holds a filer that exhibits a hop attribute needed to obtain the event has also been proposed.

For example, documents such as Japanese Laid-open Patent Publication No. 2010-49560, Japanese Laid-open Patent Publication No. 2000-22719, International Publication Pamphlet No. WO2008/102755, and Japanese Laid-open Patent Publication No. 2004-302960 are known.

An agreement state of services using IoT is managed by an application server, but the agreement state is not reported to a measurement device or to a relay device that relays a communication between the measurement device and the application server. Thus, even if the state of an agreement of a user has been changed, the measurement device and the relay device will perform processing of transmitting a measurement result similarly to the processing performed before the change of the agreement state. As a result, data that is no longer used by the user due to the agreement of the user having been changed may be transmitted to the application server, and needless communication processing may be performed. Further, even if any of the related technologies described above is used, it will be difficult to prevent a needless communication from being performed due to the change of an agreement of a user.

SUMMARY

According to an aspect of the embodiments, a server device that provides services to a terminal includes a memory, a processor, and a transceiver. The memory stores information indicating a measurement device and information indicating a relay device in association with identification information of the terminal, the measurement device performing measurement to obtain measurement data that is used in the terminal, the relay device being able to relay the measurement data to the server device. The processor generates a report packet destined for a relay device, the report packet reporting a list of a measurement device that is a transmission source of measurement data to be relayed by the relay device. The transceiver transmits the report packet. When the transceiver receives a request that the use of the services in the terminal be stopped, the processor generates a report packet destined for a relay device associated with the identification information of the terminal, the report packet including the list in which a measurement device associated with the identification information of the terminal is not included.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a sequence diagram that illustrates an example of a communication performed when an agreement has been canceled;

FIG. 8 illustrates an example of information held by the server and the relay device when the agreement has been canceled;

FIG. 9 illustrates an example of the registered information table and the white list;

FIG. 11 illustrates an example of information held by the server and the relay device when an additional relay device has been added;

FIG. 13 illustrates an example of information held by the server and the relay device when an additional measurement device has been added;

DESCRIPTION OF EMBODIMENTS

Figure 1:
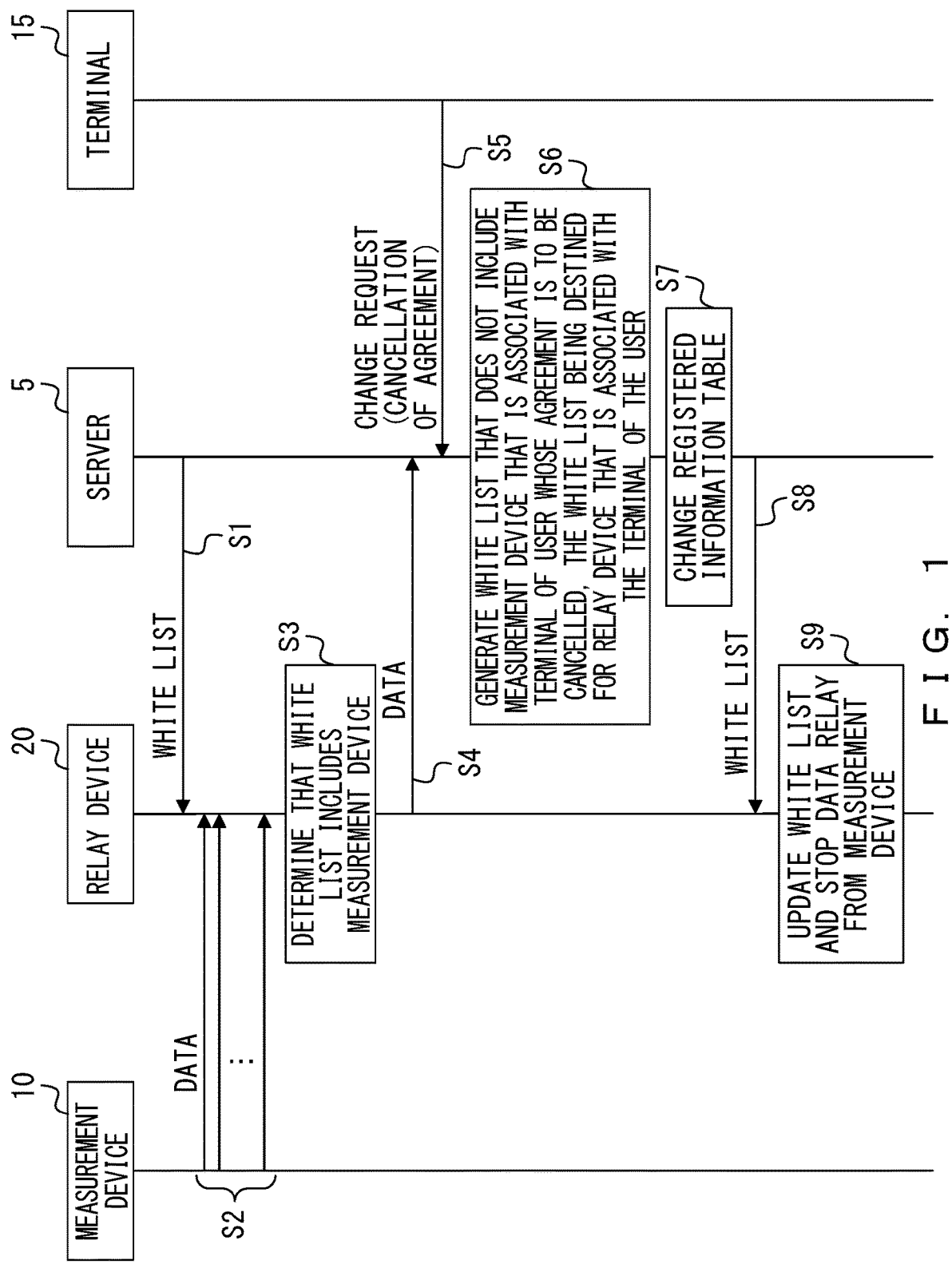
FIG. 1 illustrates an example of a communication according to embodiments.

FIG. 1 illustrates an example of a communication according to embodiments. A network according to the embodiments includes a measurement device 10, a relay device 20, and a server 5. A terminal 15 accesses the server 5, the terminal 15 being used by a user who uses an application provided by the server 5. The server 5 stores an agreement state of a user. The server 5 also stores information on a relay device 20 that is arranged in a position in which the relay device 20 can relay measurement data obtained by measurement performed by the measurement device 10, the information on a relay device 20 being included in the agreement state of a user. Information such as the agreement state of a user is recorded in a registered information table in the server 5.

According to the agreement state of a user, the server 5 specifies a measurement device 10 that obtains measurement data used when processing is performed by the server 5 or the terminal 15. The server 5 also specifies a relay device 20 that can relay data obtained by the measurement device 10 that obtains measurement data used when processing is performed by the server 5 or the terminal 15. Then, the server 5 transmits, to the specified relay device 20, a white list in which the measurement device 10 that is a transmission source of a packet to be relayed to the server 5 is recorded (Step S1). The relay device 20 stores the white list received from the server 5.

The measurement device 10 performs measurement, and data obtained by the measurement device 10 is transmitted to the relay device 20 (Step S2). The relay device 20 checks the transmission source of the packet against the white list (Step S2). In the example of FIG. 1, the relay device 20 determines that the white list includes the transmission-source measurement device 10 (Step S3). Then, the relay device 20 relays the data received from the measurement device 10 to the server 5 (Step S4).

Then, the user decides to cancel his/her agreement and changes a registration content that indicates the agreement state. The terminal 15 transmits, to the server 5, information that indicates a request for a change in the registration content (a change request) (Step S5). The change request transmitted in Step S5 includes a request for a cancellation of the agreement. When the server 5 receives the change request, the server 5 generates a white list that does not include the measurement device 10 that is associated with the terminal 15 of the user whose agreement is to be canceled, the white list being destined for the relay device 20 that is associated with the terminal of the user (Step S6). In the example of FIG. 1, a white list that does not include the measurement device 10 is generated as information to be transmitted to the relay device 20. Then, the server 5 changes a content of the registered information table (Step S7). The server 5 reports a report packet including the generated white list to the relay device 20 (Step S8). According to the reported information, the relay device 20 updates a content of a white list in which a transmission source of a packet to be relayed by the relay device 20 is recorded. In the example of FIG. 1, the relay device 20 deletes information on the measurement device 10 from a white list stored in the relay device 20, and stops relaying data from the measurement device 10 (Step S9).

As described above, in the communication method according to the embodiments, when the measurement device 10 that is a transmission source of a packet to be relayed by the relay device 20 has been changed due to a user cancelling an agreement, the server 5 reports the change to the relay device 20. This permits the relay device 20 to update a white list according to the reported change, which results in being able to avoid transferring a received packet even if the relay device 20 receives, from the measurement device 10, a measurement result that will not be used by the server 5 or the terminal 15. Thus, it is possible to avoid a needless communication performed when the measurement result that will not be used by the server 5 or the terminal 15 is transferred to the server 5 by the relay device 20, which results in improving the efficiency in a communication in a network. The processing of FIG. 1 is an example, and the order of performing the processes of Steps S6 and S7 may be changed according to the implementation.

Device Configuration

Figure 2:
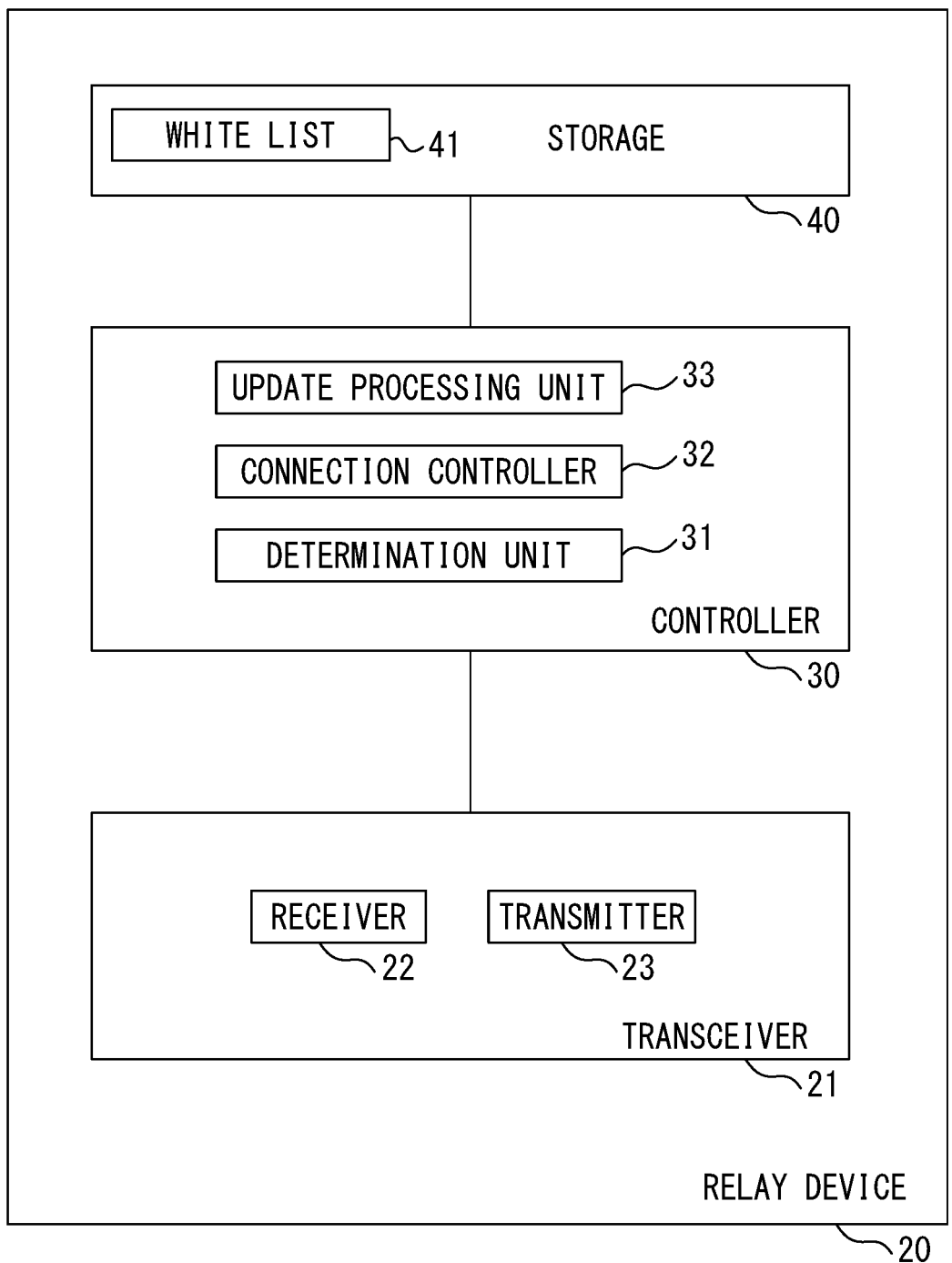
FIG. 2 illustrates an example of a configuration of a relay device.

FIG. 2 illustrates an example of a configuration of the relay device 20. The relay device 20 includes a transceiver 21, a controller 30, and a storage 40. The transceiver 21 includes a receiver 22 and a transmitter 23. The controller 30 includes a determination unit 31, a connection controller 32, and an update processing unit 33. The storage 40 stores a white list 41. Further, the storage 40 stores, as needed, data used when processing is performed by the controller 30. Information that identifies a measurement device 10 that is a transmission source of a packet to be relayed by the relay device 20 is recorded in the white list 41.

The receiver 22 receives a packet from other devices. The transmitter 23 transmits a packet to other devices. The determination unit 31 determines whether a measurement device 10 that is a transmission source of a packet obtained through the receiver 22 is recorded in the white list 41. When the measurement device 10 that is a transmission source of the packet is recorded in the white list 41, the determination unit 31 determines to relay the received packet to the server 5. When the measurement device 10 that is a transmission source of the packet is not recorded in the white list 41, the determination unit 31 determines that the received packet is not to be relayed to the server 5, and discards the received packet.

The connection controller 32 performs processing of connecting the relay device 20 to the server 5 or the measurement device 10. Further, the connection controller 32 performs processing related to a start or a termination of a communication when a new measurement device 10 is added or some of the measurement devices 10 in a network are removed. The update processing unit 33 updates the white list 41 when the update processing unit 33 receives information used to update the white list 41 through the receiver 22.

Figure 3:
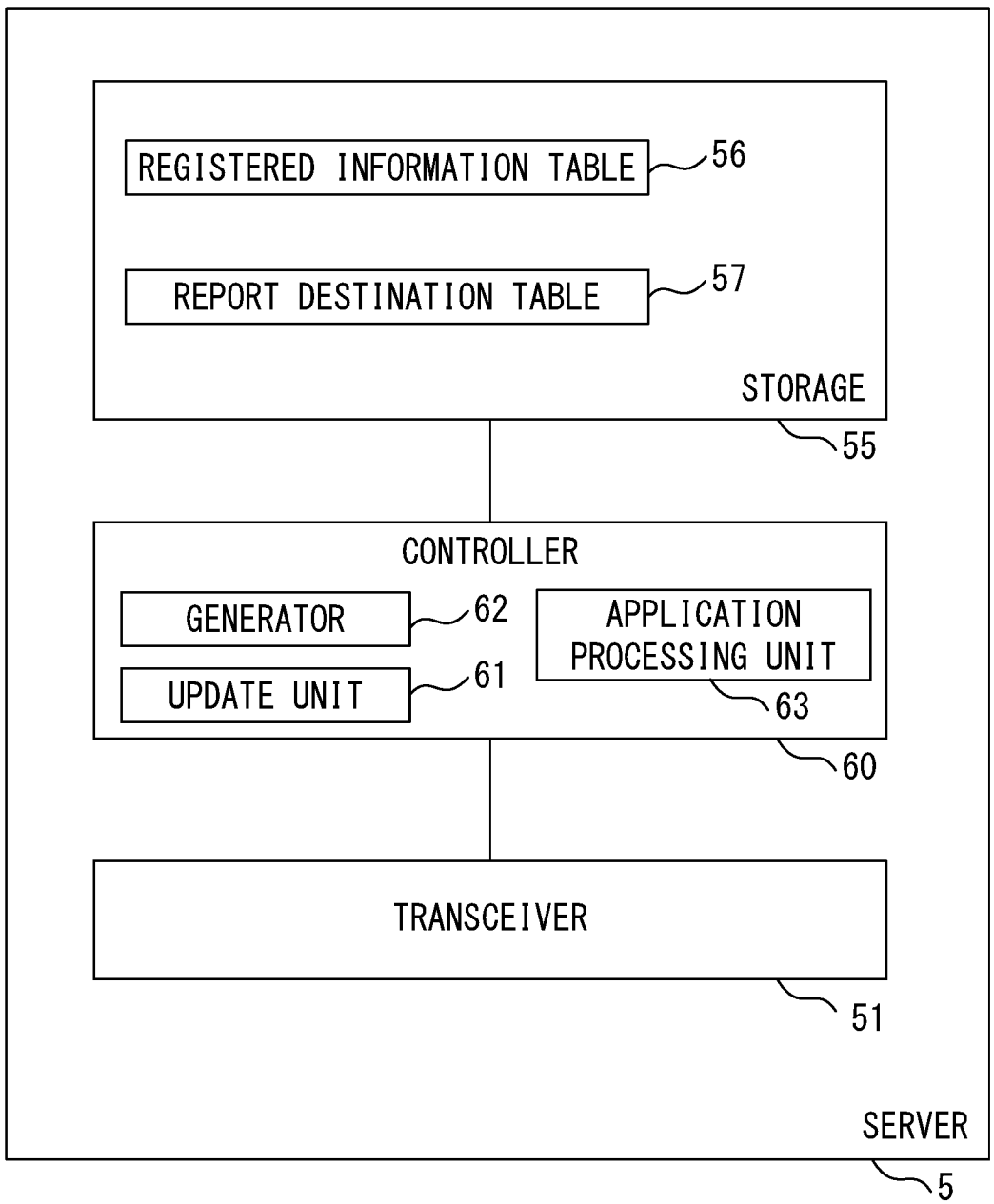
FIG. 3 illustrates an example of a configuration of a server.

FIG. 3 illustrates an example of a configuration of the server 5. The server 5 includes a transceiver 51, a storage 55, and a controller 60. The transceiver 51 communicates with other devices such as the relay device 20 and the terminal 15. The storage 55 includes a registered information table 56 and a report destination table 57. The registered information table 56 stores an agreement state of a user and a list of a measurement device 10 that is a transmission source of a packet to be relayed by a relay device 20 in a network. When the content of the registered information table 56 has been changed due to, for example, an agreement state of a user, the report destination table 57 associates an updated content in a list with a report destination of the updated content, the list being a list of a measurement device 10 that is a transmission source of a packet to be relayed by the relay device 20. Examples of the registered information table 56 and the report destination table 57 will be described later.

The controller 60 includes an update unit 61, a generator 62, and an application processing unit 63. The update unit 61 updates the registered information table 56 according to a request from the terminal 15. Further, the update unit 61 also performs processing of updating the report destination table 57 according to the update of the registered information table 56. The generator 62 generates a report packet destined for a relay device 20 recorded in the report destination table 57, the report packet reporting a list of a measurement device 10 that is a transmission source of a packet to be relayed by the relay device 20. The application processing unit 63 processes an application provided by the server 5.

Figure 4:
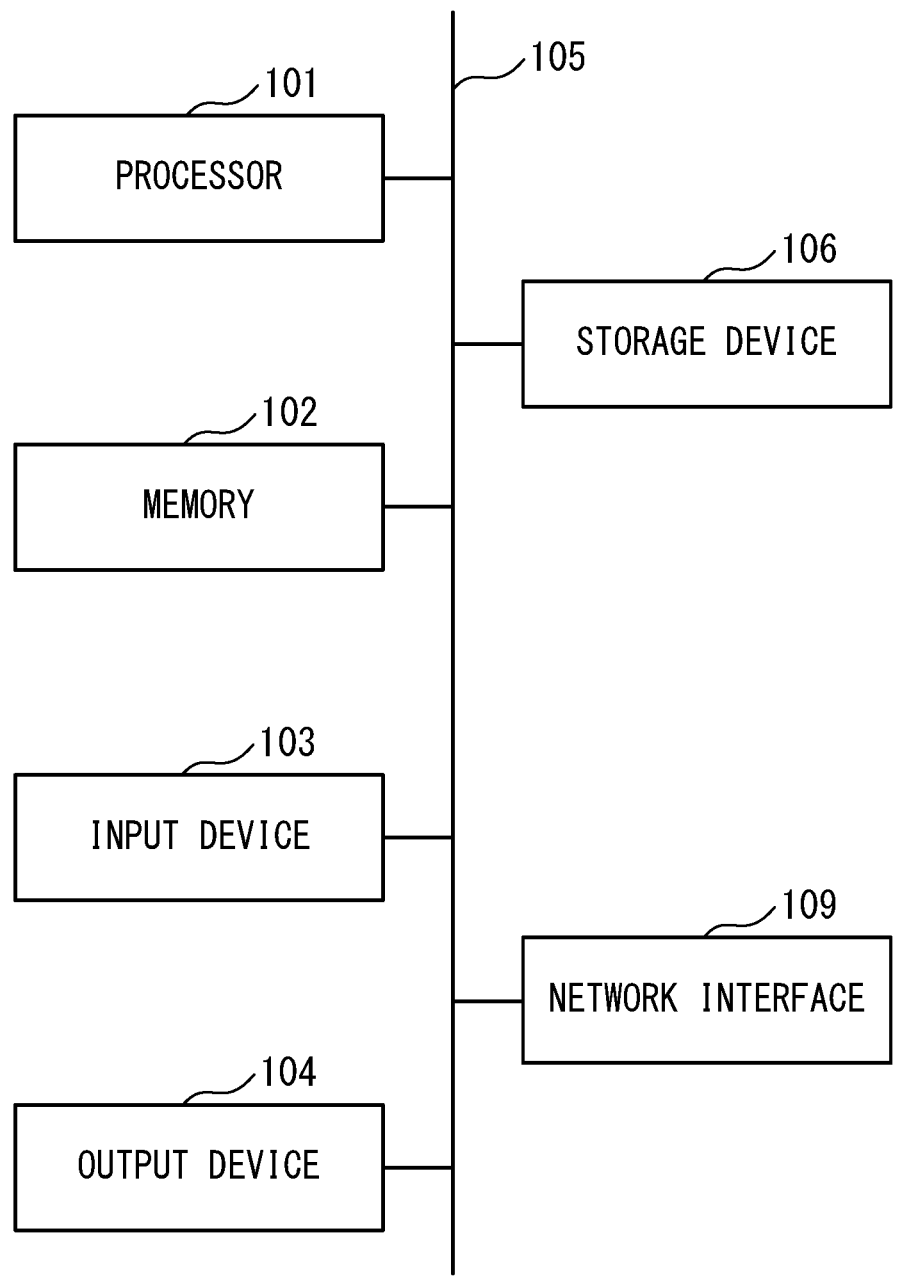
FIG. 4 illustrates an example of a hardware configuration of a relay device and a server.

FIG. 4 illustrates an example of a hardware configuration of the relay device 20 and the server 5. The relay device 20 and the server 5 each include a processor 101, a memory 102, a bus 105, and a network interface 109. The relay device 20 and the server 5 may each further include at least one of an input device 103, an output device 104, and a storage device 106. The processor 101 is an arbitrary processing circuit including a central processing unit (CPU), and can execute a program stored in the memory 102 or the storage device 106. The processor 101, the memory 102, the input device 103, the output device 104, the storage device 106, and the network interface 109 are connected to one another through the bus 105 so that each can output data to and receive an input of data from the others. The input device 103 is an arbitrary device, such as a keyboard and a mouse, that is used to input information, and the output device 104 is an arbitrary device, such as a display device, including a display, that is used to output data.

In the relay device 20, the controller 30 is implemented by the processor 101. The memory 102 and the storage device 106 operate as the storage 40. The transceiver 21 is implemented by the network interface 109 and the processor 101. In the server 5, the processor 101 operates as the controller 60, and the memory 102 and the storage device 106 operate as the storage 55. The transceiver 51 is implemented by the network interface 109 and the processor 101.

Embodiments

An example in which the server 5 transmits a packet, such as a report packet, that includes control information to the relay device 20 through an MQTT (message queue telemetry transport) server 80 is described below. When the server 5 communicates with the relay device 20 through the MQTT server 80, the server 5 will be able to transmit a packet, such as a report packet, that is destined for the relay device 20 to the MQTT server 80 without a connection being established between the server 5 and the relay device 20, if a connection has been established between the server 5 and the MQTT server 80. Further, when a connection has been established between the relay device 20 and the MQTT server 80, the relay device 20 can receive a report packet that the MQTT server 80 has received from the server 5. Thus, a communication error will be less likely to occur even if server 5 is disconnected from the relay device 20. However, the communication described below is an example, and the server 5 and the relay device 20 may communicate with each other without using the MQTT server 80.

An example in which the server 5 is an application server in a remote monitoring system is described below, and anything/anyone may be a monitoring target monitored by the remote monitoring system. For example, the monitoring target may be a companion animal or an elderly person taken care of by a user, or it may be machinery in a production line whose state will be confirmed by the user.

Figure 5:
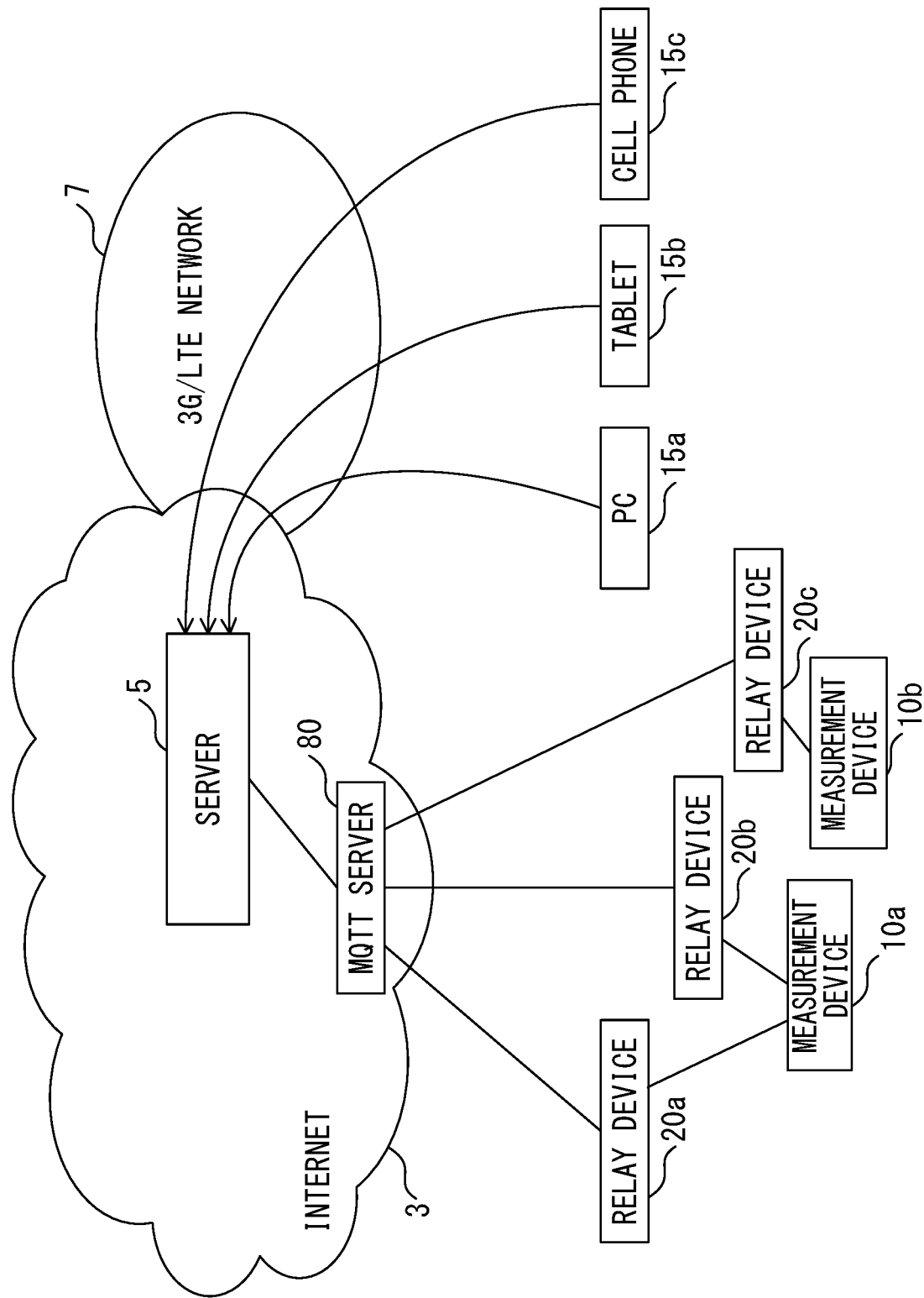
FIG. 5 illustrates an example of a system using the communication according to the embodiments.

FIG. 5 illustrates an example of a system using the communication according to the embodiments. FIG. 5 illustrates an example of the system, and the number of relay devices 20, the number of measurement devices 10, and the number of terminals 15 may be changed according to the implementation.

The server 5 and the MQTT server 80 are located on the Internet 3. Further, the Internet 3 is connected to a third generation/long term evolution (3G/LTE) network 7. The terminal 15 (15a-15c) used by a user can communicate with the server 5 on the Internet 3 through the 3G/LTE network 7. The system illustrated in FIG. 5 is an example, and the terminal 15 may communicate with the server 5 through only the Internet 3, without passing through the 3G/LTE network 7. In the example of FIG. 5, the terminal 15a is a computer, the terminal 15b is a tablet, and the terminal 15c is a cell phone, but the terminal 15 is an arbitrary device that can be used when the user accesses the server 5. The relay device 20 (20a-20c) is connected to the MQTT server 80, and each relay device 20 is provided near a measurement device 10 with which the relay device 20 may communicate. The measurement device 10 (10a, 10b) is provided near a monitoring target and obtains measurement data using a sensor. A measurement device 10 transmits a packet including data to a relay device 20 to which the measurement device 10 has been connected. In FIG. 5, with respect to each of the measurement devices 10, a measurement device 10 and a relay device 20 that are situated within a range in which they can communicate with each other are connected by a solid line, but a measurement device 10 may establish a communication with one relay device 20 at a time. For example, the measurement device 10a can communicate with both of the relay devices 20a and 20b, but the measurement device 10a may communicate with the relay device 20a, or the measurement device 10a may transmit a packet including measurement data to the relay device 20b. The measurement device 10b is provided in a position in which the measurement device 10b can communicate with the relay device 20c, and transmits a packet including measurement data to the relay device 20c.

In the following descriptions, in order to facilitate understanding of which of the devices performs processing, a reference numeral of a component in a relay device may be followed by a letter added to the end of a reference numeral of a relay device that performs processing. For example, a white list 41a is a white list 41 in the relay device 20a. Further, in the following descriptions, a certain number may be placed after the reference numeral of a table, with an underscore between the reference number and the certain number, in order to explain a plurality of states in tables of the same kind.

Figure 6:
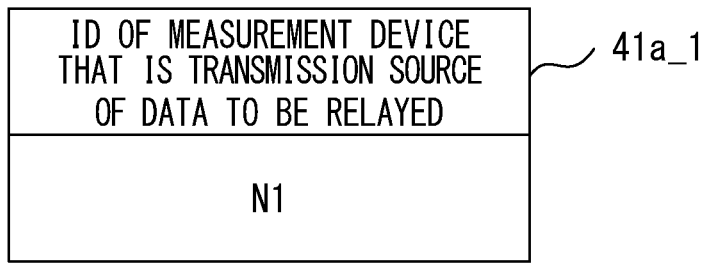
FIG. 6 illustrates examples of a registered information table and a white list.
Figure 6:
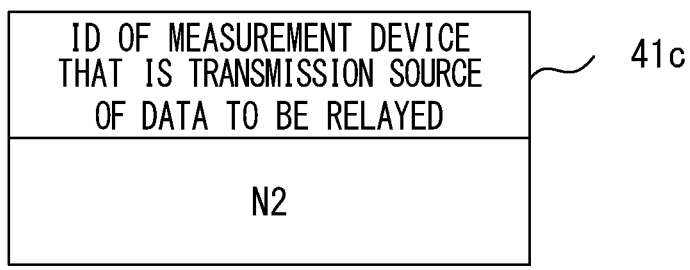

FIG. 6 illustrates examples of the registered information table 56 and the white list 41. In the registered information table 56, a user ID, a terminal ID, a relay device ID, and a measurement device ID are associated with one another for each user who uses an application provided by the server 5. The user ID is an identifier that is used to identify each user. The terminal ID is an identifier that is assigned to a terminal 15 used when a user identified by the user ID accesses the server 5. An arbitrary piece of information that can uniquely identify a terminal of a user may be used as a terminal ID, so a phone number may be used as a terminal ID when the terminal 15 is a telephone. The measurement device ID is information that identifies the measurement device 10 provided for monitoring a monitoring target of a user identified by the user ID. The relay device ID is information that identifies the relay device 20 used to relay, to the server 5, a packet transmitted from the measurement device 10 associated with a user identified by the user ID.

In the example of FIG. 6, a user identified by "user ID=user 1" places a measurement device 10 identified by "measurement device ID=N1" near a monitoring target. The communication between the measurement device 10 identified by "measurement device ID=N1" and the server 5 is relayed by a relay device 20 identified by "relay device ID=St1". When a terminal 15 used by the user 1 communicates with the server 5, phon1 is reported to the server 5 as an ID of the terminal. Likewise, the measurement device ID of a measurement device 10 used by a user identified by "user ID=user 2" is N2, and the relay device ID of a relay device 20 used by the user identified by "user ID=user 2" is St2. The terminal ID of a terminal 15 used by the user identified by "user ID=user 2" is sumaho2.

In a white list 41, a measurement device ID that identifies a measurement device 10 that is a transmission source of a packet to be relayed to the server 5 by a relay device 20 including this white list 41 is recorded. For example, it is assumed that the measurement device ID of the measurement device 10a illustrated in FIG. 5 is N1 and the measurement device ID of the measurement device 10b is N2. In this case, information on the measurement device 10a is recorded in a white list 41 held by the relay device 20a, so the white list 41 held by the relay device 20a is a white list 41a_1. Information on the measurement device 10b is recorded in a white list 41 held by the relay device 20c, so the white list 41 held by the relay device 20c is a white list 41c.

The embodiments are described below, divided into an example of processing performed when an agreement of a user has been canceled, an example of processing performed when the number of relay devices 20 has been changed, and an example of processing performed when the number of measurement devices 10 has been changed. Further, an example of processing performed by each device is described in chronological order.

(1) Example of Processing Performed when an Agreement of a User has Been Canceled FIG. 7 is a sequence diagram that illustrates an example of a communication performed when an agreement has been canceled. FIG. 8 illustrates an example of information held by the server 5 and the relay device 20 when the agreement has been canceled. An example of processing performed when a user (user 1) of a terminal 15 identified by "terminal ID=phon1" makes a request to the server 5 for a cancellation of an agreement for services in a state in which a communication is performed in the network illustrated in FIG. 5 is described below with reference to FIGS. 7 and 8. FIG. 7 illustrates an example in which the measurement device 10a transmits data to the server 5 through the relay device 20a because the communication between the measurement device 10a and the relay device 20a has been established. The relay device ID of the relay device 20a is St1 and the relay device ID of the relay device 20c is St2.

In Step S21, the measurement device 10a transmits, to the relay device 20a, a measurement result obtained by a sensor included in the measurement device 10a. When a receiver 22a of the relay device 20a receives a data packet from the measurement device 10a, the receiver 22a of the relay device 20a outputs the received packet to a determination unit 31a. The determination unit 31a determines that the transmission source of the data packet is the measurement device 10a, and the measurement ID of the measurement device 10a is N1. Here, the measurement device ID may be included in the data packet transmitted by the measurement device 10a, or the address of the measurement device 10a and the measurement device ID of measurement device 10a that are associated with each other may be stored in the determination unit 31a in advance. The determination unit 31a determines whether the measurement device ID associated with the measurement device 10a that is a transmission source of the data packet is included in the white list 41a. It is assumed that the relay device 20a holds the white list 41a_1 of FIG. 6 at the time of performing the process of Step S21. The determination unit 31a determines that the white list 41a_1 includes N1, the ID of the measurement device that is a transmission source of the data packet (Step S22). Then, the determination unit 31a relays the data packet received from the measurement device 10a to the server 5 (Step S23). As illustrated in FIG. 7, the determination unit 31a may relay data obtained by the measurement device 10a by integrating, into one packet, pieces of information in a plurality of data packets received from the measurement device 10a, and by transmitting the packet after the integration to the server 5. The relay device 20a may relay packets received from the measurement device 10 to the server 5 without integrating them. When the other relay devices 20 such as the relay device 20b and the relay device 20c relay a packet to the server 5, processing similar to processing performed in the relay device 20a is performed.

The application processing unit 63 in the server 5 obtains a packet including data through the transceiver 51. Then, the application processing unit 63 combines the obtained data with a user ID and a terminal ID that are associated with, for example, the measurement device ID of the measurement device 10a that was used to obtain measurement data, and stores them in the storage 55. This permits data reported by the relay device 20*a* to be provided to a terminal 15 identified by a terminal ID that is associated with the reported data, for example, when an inquiry is received from the terminal 15. The application processing unit 63 can use the registered information table 56 when the application processing unit 63 determines a user ID and a terminal ID that are associated with a measurement device ID.

In Step S24, the measurement device 10*b* transmits a measurement result obtained by, for example, performing measurement with a sensor to the relay device 20*c*. A determination unit 31*c* of the relay device 20*c* obtains, through a receiver 22*c*, a data packet transmitted from the measurement device 10*b*. The determination unit 31*c* determines that the measurement device ID that identifies the measurement device 10*c* that is a transmission source of the data packet is N2, which is processing similar to the processing performed by the determination unit 31*a*. The determination unit 31*c* determines that the white list 41*c* (FIG. 6) includes "measurement device ID=N2" associated with the measurement device 10*c* (Step S25). The determination unit 31*c* relays the data packet received from the measurement device 10*b* to the server 5 (Step S26). The server 5 stores the obtained data in the storage 55, as in the case of receiving a packet from the measurement device 10*a* in Step S23.

Then, in order to cancel an agreement for services provided by the server 5, the user 1 transmits, to the server 5, a change request that requests a cancellation of the agreement using the terminal 15 identified by "terminal ID=phon1" (Step S27).

The update unit 61 of the server 5 obtains the change request through the transceiver 51. When the update unit 61 receives a change request that requests a cancellation of an agreement, the update unit 61 deletes, from the registered information table 56, information associated with a terminal ID of a user whose agreement is to be canceled (Step S28). In the example of FIG. 7, the terminal 15 identified by "terminal ID=phon1" makes a request for a cancellation of an agreement. The update unit 61 deletes, from a registered information table 56_1 (FIG. 6), information associated with "terminal ID=phon1", which is the terminal ID of the terminal 15 that transmitted the change request for the cancellation of the agreement. Thus, the registered information table 56 included in the server 5 is changed from the registered information table 56_1 of FIG. 6 to a registered information table 56_2 of FIG. 8. It is assumed that the update unit 61 holds the information deleted from the registered information table 56_1 in the storage 55 as needed, in order to update the report destination table 57.

The update unit 61 registers, in the report destination table 57, a relay device 20 associated with the terminal ID of the user whose agreement is to be canceled (Step S29). A report destination table 57_1 illustrated in FIG. 8 is an example of the report destination table 57. Information on a relay device 20 for which the measurement device 10 that is a transmission source of a packet to be relayed by the relay device 20 has been changed due to a change in setting such as a cancellation of an agreement is registered in the report destination table 57 as a report destination of the change in setting. Further, an identifier assigned to a measurement device 10 that is a transmission source of a packet to be relayed by the report-destination relay device 20 after the change in setting is recorded in the report destination table 57 as an ID of a measurement device that is to be reported to the report-destination relay device 20. In other words, the ID of a measurement device to be reported to a report-destination relay device 20 is information that is recorded in a white list used by a relay device 20 included in an entry of the white list. When a user cancels an agreement, it is preferable that measurement data obtained by a measurement device 10 used by a user whose agreement is to be canceled not be transmitted to the server 5 after the user cancels an agreement. Thus, with respect to all of the relay devices 20 associated with a terminal ID of a user whose agreement is to be canceled, the update unit 61 performs a registration in the report destination table 57 such that the ID of a measurement device 10 to be reported does not include the ID of a measurement device 10 associated with the terminal ID of the user whose agreement is to be canceled. In the case of a relay device 20 that only relays a packet transmitted from a measurement device 10 associated with the terminal ID of the user whose agreement is to be canceled, there will be no transmission sources of a packet to be relayed by the relay device 20 if the user cancels the agreement. In this case, the update unit 61 registers, in the report destination table 57, information indicating that there exist no measurement devices 10 that are a transmission source of a packet to be relayed by the relay device 20.

For example, as indicated by the registered information table 56_1 of FIG. 6, "relay device ID=St1" (the relay device 20*a*) is associated with "terminal ID=phon1" before the terminal 15 identified by "terminal ID=phon1" makes a request for a cancellation of an agreement. Thus, as illustrated in FIG. 8, St1 is registered in the report destination table 57 as a relay device ID of a report-destination relay device 20. Further, the update unit 61 does not select the measurement device 10*a* associated with "terminal ID=phon1" as a transmission source of a packet to be relayed to the server 5 by the relay device 20 identified by "relay device ID=St1" after a change in setting. Except for the measurement device 10*a* associated with "terminal ID=phon1", there exist no measurement devices 10 provided in a position in which the relay device 20*a* can relay a packet, so the update unit 61 also registers, in the report destination table 57, information indicating that there exist no measurement devices 10 to be reported to the relay device 20*a*. Thus, the server 5 holds the report destination table 57_1 due to the process of Step S29.

In Step S30 of FIG. 7, the generator 62 performs processing of reporting a list of a measurement device ID of a measurement device 10 to a report-destination relay device registered in the report destination table 57_1, the measurement device 10 being associated with the report-destination relay device, the list of a measurement device ID of a measurement device 10 being a list of a transmission source of a packet that can be relayed. Thus, in Step S30, a report packet destined for the relay device 20*a* (relay device ID=St1) is generated as a list of a transmission source of a packet that can be relayed, the report packet including a list that does not include any measurement device 10. In other words, in Step S30, a report packet destined for the relay device 20*a* is generated using the report destination table 57_1, the report packet making a request that packets received from all of the measurement devices 10 not be relayed to the server 5. In the example of FIG. 7, the server 5 transmits a packet to the relay device 20 through the MQTT server 80, so the generator 62 transmits the generated report packet to the MQTT server 80 through the transceiver 51. It is assumed that the report packet includes information that can be used to determine that the report packet is destined for the relay device 20*a*.

It is assumed that, in the example of FIG. 7, a session using MQTT is constantly established between the MQTT server 80 and the server 5, and between the MQTT server 80 and the relay device 20. Further, when the session is established between the MQTT server 80 and the relay device 20, the MQTT server 80 associates a session ID with information that identifies the relay device 20 in communication with the MQTT server 80, and stores them. Thus, the MQTT server 80 transfers a report packet to a session identified by the session ID associated with a transmission destination of the report packet so as to transfer the report packet to the destination. In the example of FIG. 7, the report packet is transferred from the MQTT server 80 to the relay device 20a (Step S31).

An update processing unit 33a of the relay device 20a obtains a report packet through the receiver 22a. The update processing unit 33a updates the white list 41a_1 according to the report packet. Here, it is reported by the report packet that there exist no measurement devices 10 that are a transmission source of a packet to be relayed by the relay device 20a, so the update processing unit 33a deletes "measurement device ID=N1" of the measurement device 10a from the white list 41a_1 (Step S32). Thus, when the process of Step S32 is terminated, the measurement device 10a holds a white list 41a_2 illustrated in FIG. 8.

The measurement device 10a transmits measurement data to the relay device 20a after the process of Step S32 is performed (Step S33). The determination unit 31a of the relay device 20a obtains, through the receiver 22a, a data packet transmitted from the measurement device 10a. The determination unit 31a determines that the white list 41a_2 does not include "measurement device ID=N1" that identifies the measurement device 10a that is a transmission source of the data packet (Step S34). Thus, the determination unit 31a discards the data packet received from the measurement device 10a without relaying it to the server 5 (Step S35).

In Step S36, the measurement device 10b transmits a measurement result obtained by, for example, performing measurement with a sensor to the relay device 20c. When the terminal 15 identified by a terminal ID associated with the relay device 20c in the server 5 does not transmit a request for a change in an agreement state to the server 5, a report packet is not transmitted to the relay device 20c. Then, the processes of Steps S37 and S38 performed when the relay device 20c receives a data packet from the measurement device 10b are performed similarly to Steps S25 and S26. Thus, measurement data obtained by the measurement device 10b is reported to the server 5 through the relay device 20c.

As described with reference to FIGS. 6 to 8, according the method of the embodiments, even if measurement data is obtained by a measurement device 10 after a user cancels his/her agreement for services, the measurement data will not be relayed to the server 5, the measurement device 10 having been used by the user before the cancellation of the agreement. Thus, according to the embodiments, it is possible to avoid a needless data transfer performed when data that will not be processed by the terminal 15 of a user whose agreement has been canceled or by the server 5 is transferred to the server 5, which results in improving the efficiency in communication processing in a network.

(2) Example of Processing Performed When there is a Change Related to a Relay Device 20

The communication method according to the embodiments also provides the advantage of reducing a workload of a user because there is no need for the user to perform a setting of a relay device 20 manually even when the number of relay devices 20 used when the user performs communication processing has been increased or decreased. An example of processing performed when the setting of a relay device 20 used by a user has been changed is described below, using an example in which a user who uses a terminal 15 identified by "terminal ID=phon1" adds an additional relay device 20.

FIG. 9 illustrates an example of the registered information table 56 and the white list 41. A registered information table 56_3 is obtained by extracting information associated with "terminal ID=phon1" from information included in the registered information table 56, and the server 5 may also communicate with a device that is not registered in the registered information table 56_3. Information indicating that a user identified by "user ID=user 1" uses a measurement device 10 (the measurement device 10a) identified by "measurement device ID=N1" and a relay device 20 (the relay device 20a) identified by "relay device ID=St1" is registered in the registered information table 56_3. The terminal ID of a terminal 15 used by the user identified by "user ID=user 1" is phon1.

A white list 41_3 is an example of the white list 41 held by the relay device 20a when the user identified by "user ID=user 1" performs communication based on the information in the registered information table 56_3. Information indicating that a packet received from the measurement device 10a is transferred to the server 5 is recorded in the white list 41_3.

It is assumed that the user identified by "user ID=user 1" intends to add a relay device 20d as a device that can be used to relay a data packet from the measurement device 10a. Before registration processing is performed, a transmission source of a packet to be relayed to the server 5 is not reported to the relay device 20d by the server 5. Thus, as indicated in a white list 41d_1, the relay device 20d holds the white list 41 in which a transmission source of a packet to be relayed is not registered.

Figure 10:
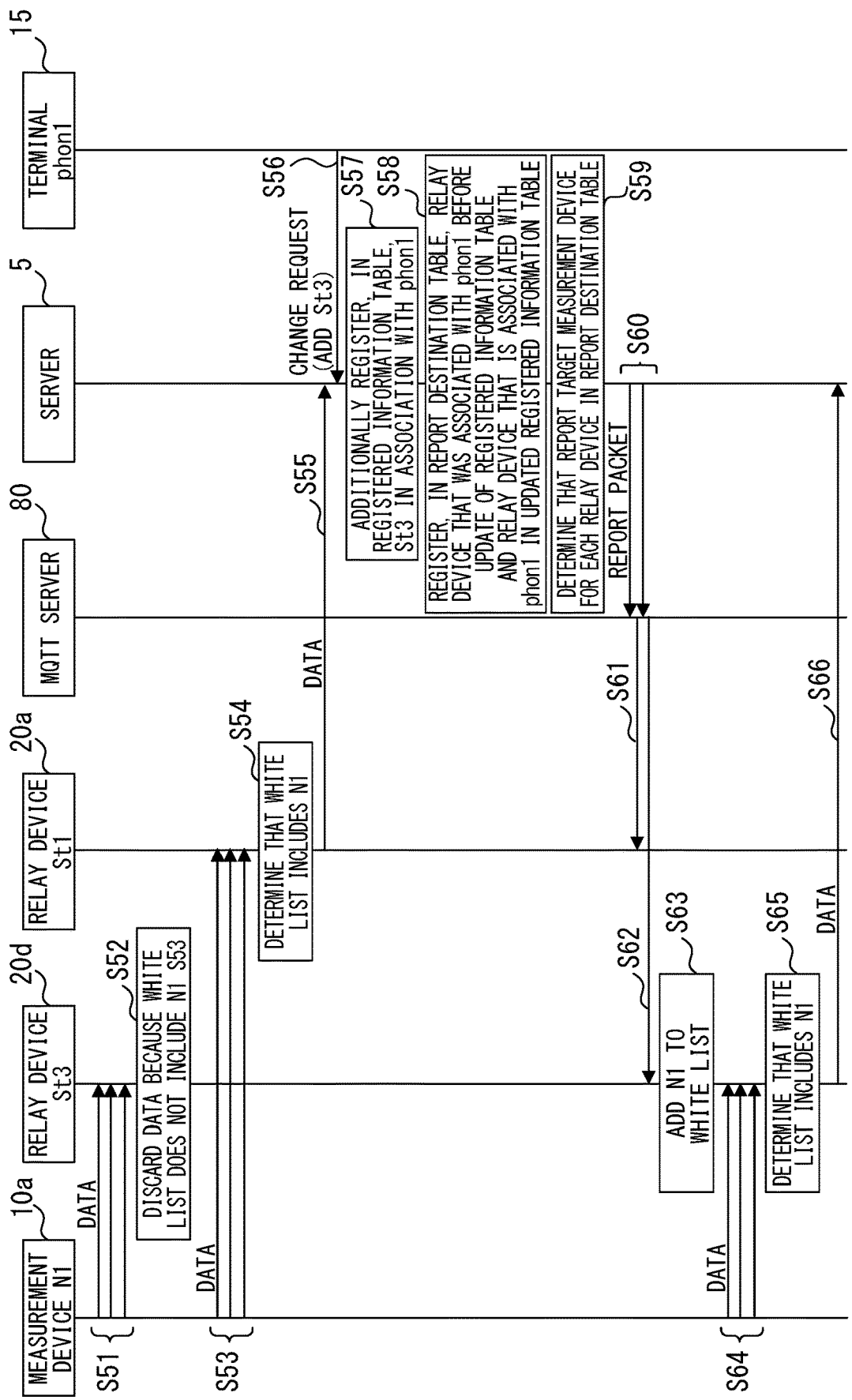
FIG. 10 is a sequence diagram that illustrates an example of a communication when an additional relay device has been added.

FIG. 10 is a sequence diagram that illustrates an example of a communication performed when an additional relay device 20 has been added. FIG. 11 illustrates an example of information held by the server 5 and the relay device 20 when the additional relay device 20 has been added.

In the following descriptions, it is assumed that the measurement device 10a performs a wireless communication and each of the relay devices 20a and 20d is provided in a position in which it can communicate with the measurement device 10a. At the time of starting performing the processing of FIG. 10, the relay device 20a holds a white list 41a_3 (FIG. 9), and the delay device 20d holds the white list 41d_1 (FIG. 9). It is assumed that the measurement device 10a is identified by "measurement device ID=N1", the relay device 20a is identified by "relay device ID=St1", and the relay device 20d is identified by "relay device ID=St3".

In Step S51, the measurement device 10a transmits a measurement result obtained by a sensor to the relay device 20d. A determination unit 31d of the relay device 20d obtains, through a receiver 22d, a data packet transmitted from the measurement device 10a. The determination unit 31d discards the data packet without relaying it to the server 5 because the white list 41d_1 does not include information ("measurement device ID=N1") on the measurement device 10a that is a transmission source of the data packet (Step S52).

After that, the measurement device 10a has been disconnected from the relay device 20d, so the measurement device 10a establishes a connection with the relay device 20a. Then, the measurement device 10a transmits a measurement result obtained by a sensor to the relay device 20a (Step S53). The determination unit 31a of the relay device 20a obtains, through the receiver 22a, a data packet transmitted from the measurement device 10a. The determination unit 31a determines that the white list 41a_3 includes information ("measurement device ID=N1") on the measurement device 10a that is a transmission source of the data packet (Step S54). The determination unit 31a relays the data packet received from the measurement device 10a to the server 5 (Step S55). The server 5 stores the obtained data in the storage 55.

The user identified by "user ID=user 1" transmits a change request to the server 5 using the terminal 15 identified by "terminal ID=phon1", in order to change a state of an agreement for services provided by the server 5 (Step S56). In Step S56, a change request is transmitted that makes a request that the use of the relay device 20d when the user 1 relays data be started.

The update unit 61 of the server 5 obtains the change request through the transceiver 51 and updates information associated with a terminal ID of the terminal that transmitted the request for an additional relay device 20. In other words, the update unit 61 adds a relay device 20 (the relay device 20d) identified by "relay device ID=St3" to an entry, in the registered information table 56_3 (FIG. 9), that includes "terminal ID=phon1" (Step S57). As a result, the relay device IDs of relay devices 20 associated with "terminal ID=phon1" are St1 and St3. Thus, due to the processing performed by the update unit 61, the registered information table 56 is updated from the registered information table 56_3 to a registered information table 56_4 of FIG. 11.

The update unit 61 registers, in the report destination table 57, a relay device 20 that was associated with "terminal ID=phon1" before the update of the registered information table 56, and a relay device 20 that is associated with "terminal ID=phon1" after the update of the registered information table 56 (Step S58). In this example, "relay device ID=St1" is recorded in the registered information table 56_3 and "relay device ID=St1,St3" is recorded in the registered information table 56_4, so "relay device ID=St1, St3" is recorded in the report destination table 57. With respect to each relay device 20 in the report destination table 57, the update unit 61 determines, as a measurement device 10 to be reported, a measurement device 10 that is a transmission source of a packet to be relayed to the server 5 (Step S59). In other words, in Step S59, the content of a white list is determined for each of the relay devices 20 associated with "terminal ID=phon1" in at least one of the registered information table 56 before it is updated and the registered information table 56 after it is updated. At the time of performing the process of Step S59, a measurement device 10 identified by "measurement device ID=N1" is registered in the registered information table 56_4, and a relay device identified by "relay device ID=St1" and a relay device identified by "relay device ID=St3" are registered in the registered information table 56_4 as rely devices 20. Thus, the update unit 61 determines that the measurement device 10 identified by "measurement device ID=N1" is a measurement device 10 to be reported to both the relay device identified by "relay device ID=St1" and the relay device identified by "relay device ID=St3". Due to the processes of Steps S58 and S59, the server 5 holds a report destination table 57_2 illustrated in FIG. 10.

In Step S60, the generator 62 reports a list of a measurement device ID of a measurement device 10 to each report destination registered in the report destination table 57_2, the measurement device 10 being associated with the report destination in the report destination table 57_2, the list being a list of a transmission source of a packet that can be relayed. Thus, in Step S60, a report packet destined for the relay device 20a ("relay device ID=St1") and the relay device 20d ("relay device ID=St3") is generated, the report packet reporting that a packet received from the measurement device 10a is to be relayed to the server 5. The generator 62 transmits the generated report packet to the MQTT server 80 through the transceiver 51. The MQTT server 80 transfers the report packet to the relay device 20a and the relay device 20d by the procedure similar to the processing described with reference to FIG. 7 (Steps S61, S62).

The update processing unit 33a of the relay device 20a obtains the report packet through the receiver 22a. The update processing unit 33a does not update the white list 41 because the information reported by the report packet is identical to the information in the white list 41a_3 (FIG. 9).

In the relay device 20d, an update processing unit 33d updates the white list 41d_1 (FIG. 9) because the information reported by the report packet is different from the information in the white list 41d_1. In other words, the update processing unit 33d adds the information "measurement device ID=N1" (the measurement device 10a) to the white list 41d_1 (Step S63). A white list 41d_2 of FIG. 11 is the white list 41 obtained by performing the process of Step S63.

After the process of Step S63 is performed, the measurement device 10a transmits measurement data to the relay device 20d (Step S64). The determination unit 31d of the relay device 20d obtains, through the receiver 22d, a data packet transmitted from the measurement device 10a. At this point, the determination unit 31d determines that the white list 41d_2 includes "measurement ID=N1" identifying the measurement device 10a that is a transmission source of the data packet (Step S65), because the white list 41 has been updated by performing the process of Step S63. Then, the determination unit 31d relays the data packet received from the measurement device 10a to the server 5 (Step S66).

The example in which an additional relay device 20 is added has been described above, but processing similar to the processing described with reference to FIGS. 9 to 11 is performed when the use of some of a plurality of relay devices 20 is stopped.

For example, as described using FIG. 10, after the state is changed to a state in which data obtained by measurement performed by the measurement device 10a is to be relayed to the server 5 by both of the relay devices 20a and 20d, a user stops using the relay device 20a. In this case, as in the process of Step S56 of FIG. 10, the user reports change processing to the server 5 using the terminal 15 identified by "terminal ID=phon1". Then, the update unit 61 of the server 5 deletes the relay device ID (St1) of the relay device 20a from information associated with "terminal ID=phon1" in the registered information table 56. Further, the update unit 61 performs the processes of Steps S57 to S59. Thus, in the report destination table 57, information on a measurement device 10 associated with "terminal ID=phon1" is not included in the ID of a measurement device to be reported to the relay device 20a which is no longer associated with "terminal ID=phon1" due to the update of the registered information table 56. On the other hand, the information on a measurement device 10 associated with "terminal ID=phon1" is included in the ID of a measurement device to be reported to a relay device 20 that is associated with "terminal ID=phon1" in the updated registered information table 56. For example, a report destination table 57 that holds the following information is generated.

report-destination relay device ID: St1 (relay device 20a)
ID of a measurement device to be reported to the relay device 20a: N/A report-destination relay device ID: St3 (relay device 20*d*)

ID of a measurement device to be reported to the relay device 20*d*: N1 (measurement device 10*a*)

Then, the generator 62 refers to information in the report destination table 57 and transmits a report packet. Thus, the generator 62 generates a report packet that is destined for the relay device 20*a* and that reports a list that does not include a measurement device 10 that is a transmission source of a packet to be relayed. The generator 62 generates a report packet that is destined for the relay device 20*d* and that includes a list that includes information on the measurement device 10*a* as a transmission source of the packet to be relayed. Thus, when a white list 41 has been updated in each relay device according to a report packet, measurement data from the measurement device 10*a* is not relayed to the server 5 through the relay device 20*a*. On the other hand, the measurement data obtained by the measurement device 10*a* is relayed to the server 5 through the relay device 20*d*.

As described above, according to the method of the embodiments, even when the number of relay devices 20 has been changed, each relay device 20 performs processing of relaying data according to a white list 41 held by the relay device 20. The white list 41 is changed according to a change in information on an agreement of a user using a report packet, the information on an agreement of a user being managed in the server 5. Thus, according to the method of the embodiments, it is possible to avoid a needless communication performed when data is transmitted to the server 5 from a relay device 20 that is no longer used to perform relay processing, which results in improving the efficiency in communication processing in a network.

Further, even when the addition of a relay device 20 and the deletion of a relay device 20 are performed at the same time, or even when the relay device 20 used to perform relay processing is switched but a total number of relay devices 20 remains unchanged between before and after the switching, processing similar to the processing described in FIGS. 9 to 11 may be performed. Thus, due to a communication between the server 5 and a relay device 20, a setting of the relay device 20 is performed automatically without a user performing a setting of the relay device 20. This permits a user to perform settings more easily.

(3) Example of Processing Performed when there is a Change Related to a Measurement Device 10

Figure 12:
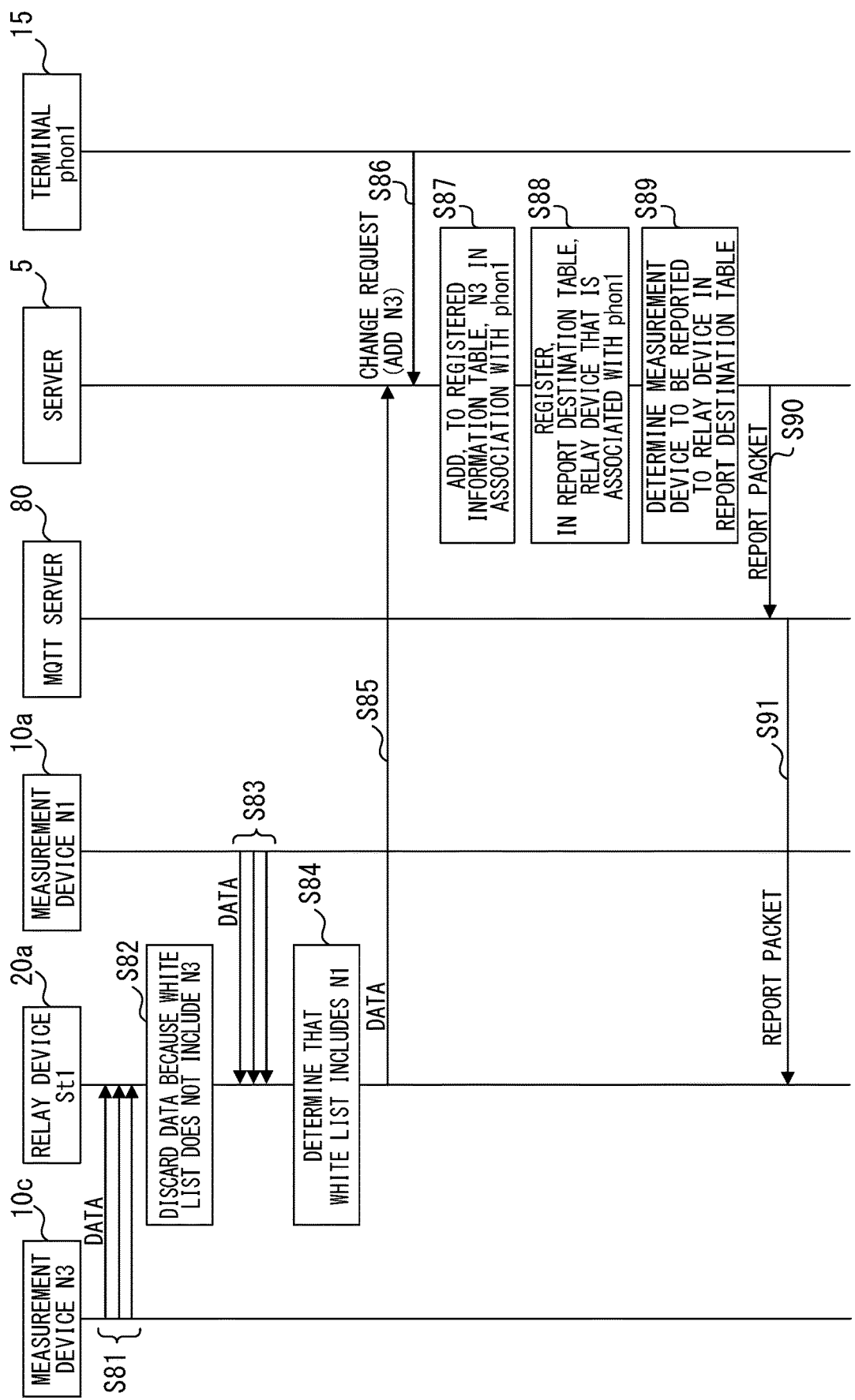
FIG. 12 is a sequence diagram that illustrates an example of a communication performed when an additional measurement device has been added.

FIG. 12 is a sequence diagram that illustrates an example of a communication performed when an additional measurement device 10 has been added. FIG. 13 illustrates an example of information held by the server 5 and the relay device 20 when an additional measurement device 10 has been added. An example of processing performed when the setting related to a measurement device 10 used by a user has been changed is described below with reference to FIGS. 12 and 13, using an example in which a user who uses a terminal 15 identified by "terminal ID=phon1" adds an additional measurement device 10*c*. It is assumed that, at the time of starting performing the processing of FIG. 12, a setting of the measurement device 10*c* has not been performed. At the time of starting performing the processing of FIG. 12, the server 5 holds the registered information table 56_3 illustrated in FIG. 9, and the relay device 20*a* holds the white list 41*a*_3 illustrated in FIG. 9.

In Step S81, the measurement device 10*c* transmits a measurement result obtained by a sensor to the relay device 20*a*. The determination unit 31*a* of the relay device 20*a* obtains, through the receiver 22*a*, a data packet transmitted from the measurement device 10*c*. The determination unit 31*a* discards the data packet without relaying it to the server 5 because the white list 41*a*_3 does not include information ("measurement device ID=N3") on the measurement device 10*c* that is a transmission source of the data packet (Step S82).

In Step S83, the measurement device 10*a* transmits a measurement result obtained by a sensor to the relay device 20*a*. The determination unit 31*a* of the relay device 20*a* obtains, through the receiver 22*a*, a data packet transmitted from the measurement device 10*a*. The determination unit 31*a* determines that the white list 41*a*_3 includes information ("measurement device ID=N1") on the measurement device 10*a* that is a transmission source of the data packet (Step S84). The determination unit 31*a* relays the data packet received from the measurement device 10*a* to the server 5 (Step S85). The server 5 stores the obtained data in the storage 55.

A user identified by "user ID=user 1" transmits a change request to the server 5 using the terminal 15 identified by "terminal ID=phon1", in order to change a state of an agreement for services provided by the server 5 (Step S86). In Step S86, the user identified by "user ID=user 1" transmits a change request that makes a request that measurement data obtained by the measurement device 10*c* as well as measurement data obtained by the measurement device 10*a* be used by an application provided by the server 5.

The update unit 61 of the server 5 obtains the change request through the transceiver 51 and updates information associated with a terminal ID of the terminal that transmitted the request for an additional measurement device 10. In other words, the update unit 61 adds a measurement device 10 (the measurement device 10*c*) identified by "measurement device ID=N3" to an entry, in the registered information table 56_3 (FIG. 9), that includes "terminal ID=phon1" (Step S87). As a result, the measurement device IDs of measurement devices 10 associated with "terminal ID=phon1" are N1 and N3. Thus, due to the processing performed by the update unit 61, the registered information table 56 is updated from the registered information table 56_3 to a registered information table 56_5 of FIG. 13.

The update unit 61 registers, in the report destination table 57, a relay device 20 associated with "terminal ID=phon1" before and after the update of the registered information table 56 (Step S88). In the example of FIG. 12, only "relay device ID=St1" is recorded in the registered information table 56_5, so "relay device ID=St1" is recorded in the report destination table 57. With respect to the relay device 20 in the report destination table 57, the update unit 61 determines, as a measurement device 10 to be reported, a measurement device 10 that is a transmission source of a packet to be relayed to the server 5 (Step S89). At the time of performing the process of Step S89, measurement devices 10 identified by "measurement device ID=N1" and "measurement device ID=N3" are registered in the registered information table 56_5. Thus, the update unit 61 determines that the measurement devices identified by "measurement device ID=N1" and "measurement device ID=N3" are measurement devices 10 to be reported to the relay device 20 identified by "relay device ID=St1". Due to the processes of Steps S88 and S89, the server 5 holds a report destination table 57_3 illustrated in FIG. 13.

In Step S90, the generator 62 transmits a report packet including a list of a measurement device ID of a measurement device 10 to each report destination registered in the report destination table 57_3, the measurement device 10 being associated with the report destination in the report destination table 57_3, the list being a list of a transmission source of a packet that can be relayed. Thus, in Step S90, a report packet destined for the relay device 20a ("relay device ID=St1") is generated, the report packet reporting that a packet received from the measurement device 10a and a packet received from the measurement device 10c are to be relayed to the server 5. The generator 62 transmits the generated report packet to the MQTT server 80 through the transceiver 51. The MQTT server 80 transfers the report packet to the relay device 20a by the procedure similar to the processing described with reference to FIG. 7 (Step S91).

The update processing unit 33a of the relay device 20a obtains the report packet through the receiver 22a. The update processing unit 33a updates the white list 41a_3 (FIG. 9) because the information reported by the report packet is different from the information in the white list 41a_3. In other words, the update processing unit 33a adds the information "measurement device ID=N3" (the measurement device 10c) to the white list 41a_3. A white list 41a_4 of FIG. 13 is the white list 41 obtained by performing this process.

Figure 14:
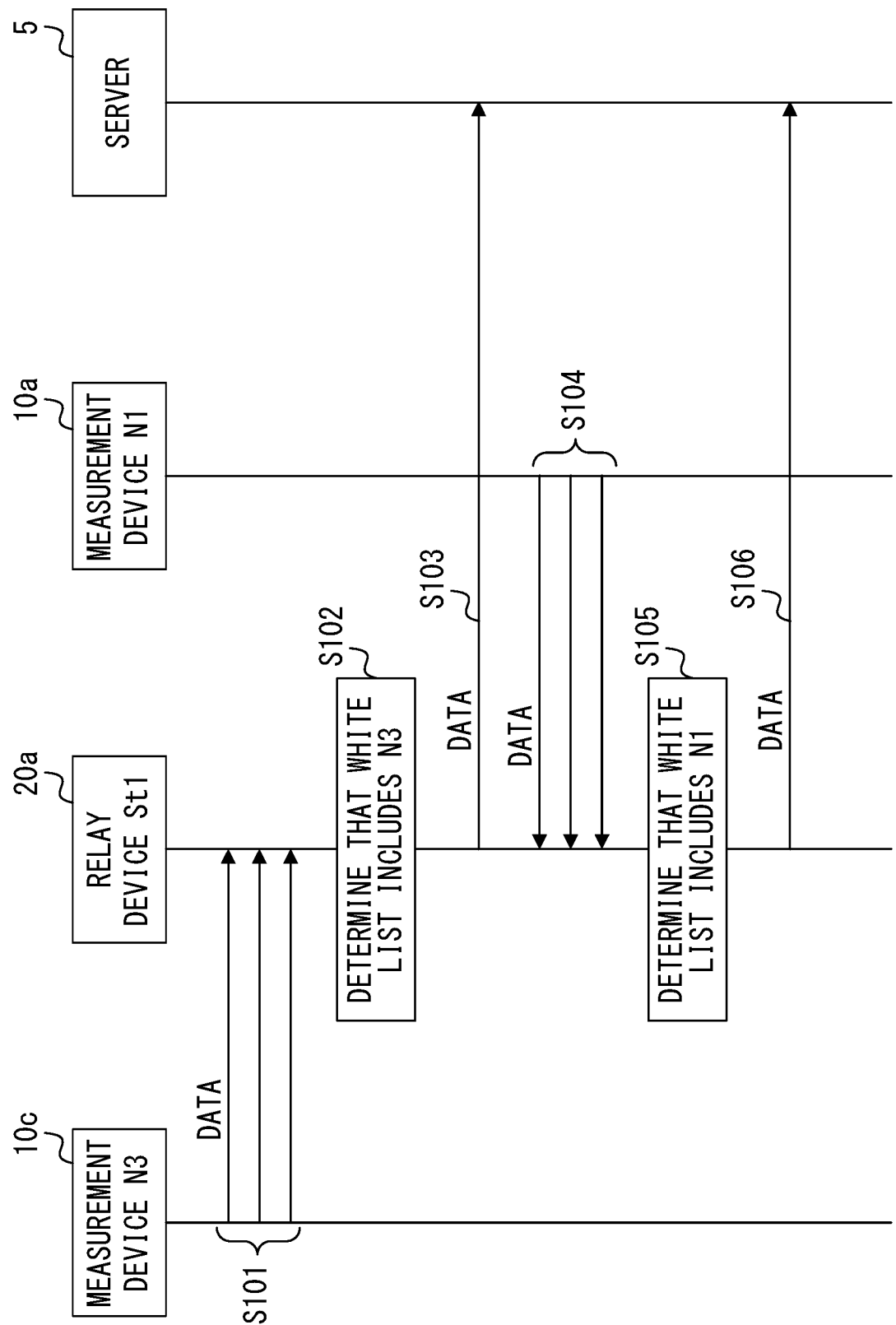
FIG. 14 is a sequence diagram that illustrates an example of a communication performed after an additional measurement device is added.

FIG. 14 is a sequence diagram that illustrates an example of a communication performed after an additional measurement device 10 is added. It is assumed that data is transmitted from the measurement device 10c to the relay device 20a after the processing described with reference to FIGS. 12 and 13 is terminated (Step S101). Then, the determination unit 31a of the relay device 20a obtains, through the receiver 22a, a data packet transmitted from the measurement device 10c. The determination unit 31a determines that the white list 41a_4 (FIG. 13) includes information ("measurement device ID=N3") on the measurement device 10c that is a transmission source of the data packet (Step S102). The determination unit 31a relays the data packet received from the measurement device 10c to the server 5 (Step S103).

It is assumed that data is also transmitted from the measurement device 10a to the relay device 20a in Step S104. Then, the determination unit 31a of the relay device 20a determines that the white list 41a_4 (FIG. 13) includes information ("measurement device ID=N1") on the measurement device 10a that is a transmission source of the data packet (Step S105). The determination unit 31a relays the data packet received from the measurement device 10a to the server 5 (Step S106).

The example in which an additional measurement device 10 is added has been described above, but processing similar to the processing described with reference to FIGS. 12 to 14 is performed when the use of some of a plurality of measurement devices 10 is stopped.

For example, as described using FIG. 12, after the state is changed to a state in which both measurement data obtained by the measurement device 10a and measurement data obtained by the measurement device 10c are to be relayed to the server 5 by the relay device 20a, a user stops using the measurement device 10a. In this case, as in the process of Step S86 of FIG. 12, the user reports change processing to the server 5 using the terminal 15 identified by "terminal ID=phon1". Then, the update unit 61 of the server 5 deletes the measurement device ID (N1) of the measurement device 10a from information associated with phon1 in the registered information table 56. Further, the update unit 61 performs processing similar to Steps S87 to S89, so the report destination table 57 holds the following information.

report-destination relay device ID: St1 (relay device 20a)
ID of a measurement device to be reported to the relay device 20a: N3 (measurement device 10c)

Then, the generator 62 refers to information in the report destination table 57 and transmits a report packet. The generator 62 reports to the relay device 20a that only the measurement device 10c is a transmission source of a packet to be relayed. Thus, when the relay device 20a updates its own white list 41, measurement data from the measurement device 10a is not relayed to the server 5 through the relay device 20a. On the other hand, measurement data obtained by the measurement device 10c is relayed to the server 5 through the relay device 20a.

Further, even when the addition of a measurement device 10 and the deletion of a measurement device 10 are performed at the same time, or even when the measurement device 10 used for measurement is switched but a total number of measurement devices 10 remains unchanged between before and after the switching, processing similar to the processing described in FIGS. 12 to 14 may be performed. Thus, due to a communication between the server 5 and a relay devices 20, a setting of the relay device 20 is automatically performed according to a change in a setting of a measurement device 10, without a user performing a setting of the relay device 20. This permits a user to perform settings more easily.

(4) Procedure of Processing Performed by Each Device

Figure 15:
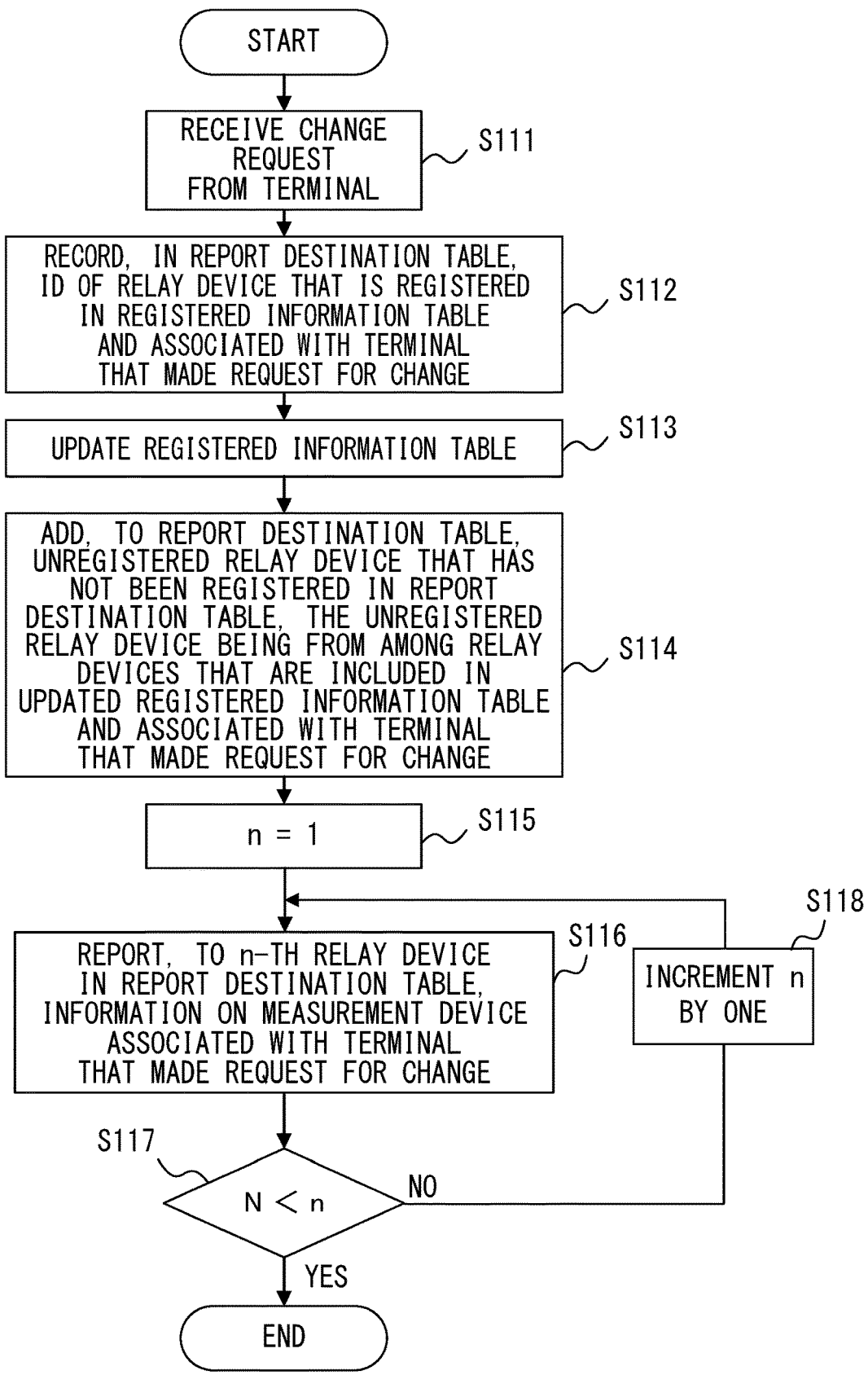
FIG. 15 is a flowchart that illustrates an example of processing performed by the server when the server receives a change request.

FIG. 15 is a flowchart that illustrates an example of processing performed by the server 5 when the server 5 receives a change request. An invariable N and a variable n are used in the flowchart of FIG. 15. The invariable N represents a total number of relay devices 20 included in the report destination table 57, and the variable n is used to count the number of relay devices 20 that are destinations of report packets.

The transceiver 51 receives a change request from a terminal 15 (Step S111). The update unit 61 records, in the report destination table 57, an ID of a relay device 20 that is registered in the registered information table 56 in association with the terminal 15 that made the request for a change (Step S112). The update unit 61 updates the registered information table 56 (Step S113). The update unit 61 adds, to the report destination table 57, an unregistered relay device 20 that has not been registered in the report destination table 57, the unregistered relay device 20 being from among relay devices 20 that are included in the updated registered information table 56 and associated with the terminal 15 that made the request for a change (Step S114). The generator 62 sets the variable n to one (Step S115). The generator 62 transmits a report packet to an n-th relay device 20 in the report destination table 57, the report packet reporting information on a measurement device 10 that is associated with the terminal 15 that made the request for a change (Step S116). The generator 62 determines whether the variable n is greater than the invariable N (Step S117). When the variable n is not greater than the invariable N, the generator 62 increments the variable n by one and the process returns to Step S116 (No in Step S117, Step S118). When the variable n is greater than the invariable N, the generator 62 terminates the processing.

The processing performed in FIG. 15 is an example, and various modifications may be added thereto according to the implementation, such as the case in which the order of performing the processes of Steps S112 and S113 is changed. When the process of Step S112 is performed after the process of Step S113, the update unit 61 stores, in the storage 55 and as needed, information included in the registered information table 56 before it is updated.

Figure 16:
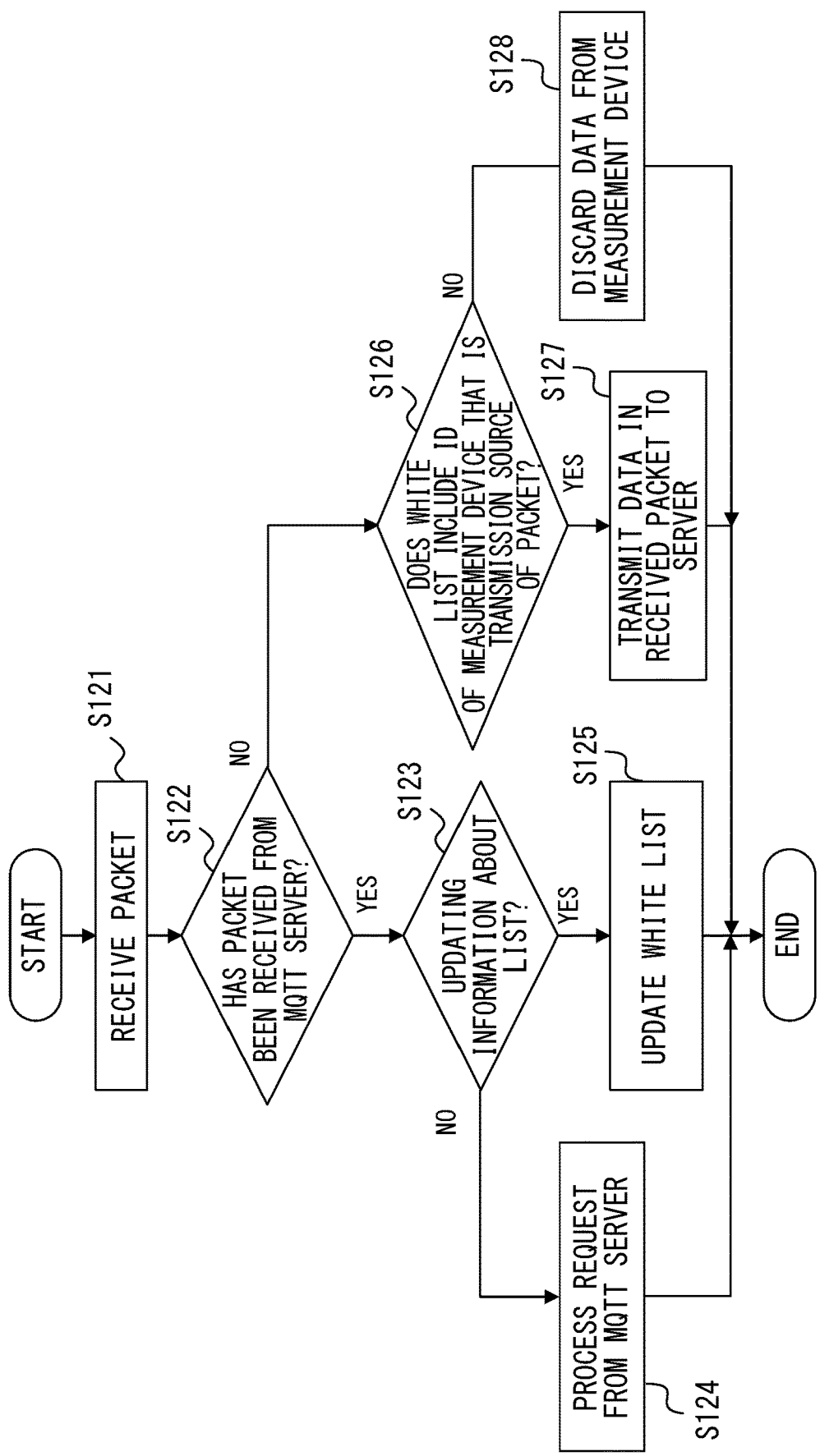
FIG. 16 is a flowchart that illustrates an example of processing performed by the relay device.

FIG. 16 is a flowchart that illustrates an example of processing performed by the relay device 20. FIG. 16 illustrates an example of processing performed when the relay device 20 receives a packet from the server 5 through the MQTT server 80. The relay device 20 may communicate with the server 5 without using the MQTT server 80.

The receiver 22 receives a packet (Step S121). The receiver 22 determines whether the receiver 22 has received the packet from the MQTT server 80 (Step S122). When the receiver 22 has received the packet from the MQTT server 80, the receiver 22 outputs the received packet to the update processing unit 33 (Yes in Step S122). The update processing unit 33 determines whether the received packet includes updating information about the white list 41 (Step S123). When the received packet does not include the updating information about the white list 41, the update processing unit 33 processes a request from the MQTT server 80 (No in Step S123, Step S124). When the request from the MQTT server 80 is related to connection processing, the connection controller 32 may process the request from the MQTT server 80. When the received packet includes the updating information about the white list 41, the update processing unit 33 updates the white list 41 using information included in the packet received from the MQTT server 80 (Yes in Step S123, Step S125).

When the receiver 22 has not received the packet from the MQTT server 80, the receiver 22 determines that the receiver 22 has received the packet from the measurement device 10, and outputs the received packet to the determination unit 31 (No in Step S122). The determination unit 31 determines whether the white list 41 includes a measurement device ID of the measurement device 10 that is a transmission source of the packet (Step S126). When the white list 41 includes the measurement device ID of the measurement device 10 that is a transmission source of the packet, the determination unit 31 transmits data included in the received packet to the server 5 through the transmitter 23 (Yes in Step S126, Step S127). When the white list 41 does not include the measurement device ID of the measurement device 10 that is a transmission source of the packet, the determination unit 31 discards the data received from the measurement device 10 and terminates the processing (No in Step S126, Step S128).

As described above, according to the method of the embodiments, even when a user has canceled an agreement, or even when the relay device 20 or the measurement device 10 used by the user has been switched, the white list 41 held by the relay device 20 is changed autonomously according to a change in the information on an agreement of a user. Thus, according to the method of the embodiments, it is possible to avoid a needless communication performed when data is transmitted to the server 5 from a relay device 20 that is no longer used to perform relay processing, which results in improving the efficiency in communication processing in a network. Further, the workload of a user who uses a system is reduced because the white list 41 is changed autonomously.

The embodiments of the present invention are not limited to the examples described above, and various modifications may be made thereto. Some examples are described below.

The tables described above are examples, and various modifications may be made thereto according to the implementation. For example, the information elements included in each table may be modified according to the implementation. For example, not only when a user cancels an agreement, but also when the user stops using services temporarily or in the long term, processing similar to the processing performed at the time of cancelling an agreement.

The example in which a communication from the relay device 20 to the server 5 is performed using a route that does not pass through the MQTT server 80 has been described above, but this is just an example. A data transfer from the relay device 20 to the server 5 may also be performed through the MQTT server 80 as in the case of transmitting a report packet from the server 5 to the relay device 20.

The change related to a measurement device 10 and the change related to a relay device 20 may be performed in parallel. In this case, as described with reference to FIG. 10, a report packet is also transmitted to a relay device 20 that is no longer associated with a terminal 15 due to the changes, the report packet including a list that reports a transmission source of a packet to be relayed.

As described above, according to the server device, the communication system, and the communication program of the embodiments, the efficacy in communication processing in a network is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A server device that provides services to a terminal, the server device comprising:
   a memory configured to store information indicating one or more measurement devices and information indicating one or more relay devices in association with identification information of the terminal, the one or more measurement devices performing one or more measurements to obtain measurement data that is used in the terminal, the one or more relay devices being able to relay the measurement data to the server device;
   a processor configured to generate one or more report packets that are each destined for at least one of the relay devices, each report packet reporting a corresponding list of one or more white-listed measurement devices that are a transmission source of measurement data to be relayed by a respective relay device of the one or more relay devices to the server device; and
   a transceiver configured to transmit the one or more report packets, wherein:
   when the transceiver receives a request that the use of the services in the terminal be stopped, the processor:
      generates a first report packet destined for a first relay device associated with the identification information of the terminal, the first report packet including a first list in which the one or more measurement devices associated with the identification information of the terminal are not included; and
      makes a request to a second relay device that measurement data received by the second relay device not be relayed to the server device in response to the second relay device relaying only measurement data transmitted from measurement devices associated with the identification information of the terminal.

2. The server device according to claim 1, wherein:
   when the transceiver receives a change request that requests at least one change related to the one or more relay devices, the processor performs, according to the change request, processing of updating a combination of the one or more measurement devices and the one or more relay devices that are stored in the memory in association with the identification information of the terminal, and the processor generates a second report packet destined for a second relay device that was associated with the terminal before the updating processing is performed and is no longer associated with the terminal due to the updating processing being performed, the second report packet including a second list in which at least one measurement device of the one or more measurement devices that was associated with the terminal before the updating processing is performed is not included.

3. The server device according to claim 2, wherein:

the processor generates a third report packet destined for a third relay device associated with the terminal after the updating processing is performed, so as to cause the third relay device newly associated with the terminal due to the updating processing being performed to relay a packet to the server device, the third report packet including a third list in which a particular measurement device associated with the terminal after the updating processing is performed is included, the packet having been transmitted by the particular measurement device associated with the terminal after the updating processing is performed.

4. The server device according to claim 2, wherein:

when the transceiver receives another change request that requests at least one change related to a particular measurement device that performs measurement to obtain measurement data that is used in the terminal, the processor updates, according to the another change request, a combination of the particular measurement device and a third relay device that are associated with the identification information of the terminal, and the processor generates a third report packet destined for the third relay device associated with the terminal, the third report packet including a third list in which the particular measurement device associated with the terminal after the updating is performed using the another change request is included.

5. A communication system comprising:

a server device configured to provide services to a terminal;

at least one measurement device configured to perform measurement processing; and at least one relay device that is able to communicate with the server device, wherein:

the server device stores information indicating one or more measurement devices of the at least one measurement device and information indicating one or more relay devices of the at least one relay device in association with identification information of the terminal, the one or more measurement devices performing one or more measurements to obtain measurement data that is used in the terminal, the one or more relay devices being able to relay the measurement data to the server device, when the server device receives a request that the use of the services in the terminal be stopped, the server device:

transmits a first report packet to a first relay device associated with the identification information of the terminal, the first report packet including a first list in which the one or more measurement devices associated with the identification information of the terminal are not included, the first list being a report list of white listed measurement devices that are a transmission source of measurement data to be relayed by the first relay device, and transmits a request to a second relay device that measurement data received by the second relay device not be relayed to the server device in response to the second relay device relaying only measurement data transmitted from measurement devices associated with the identification information of the terminal.

6. The communication system according to claim 5, wherein:

when the server device receives a change request that requests at least one change related to the one or more relay devices, the server device performs, according to the change request, processing updating a combination of the one or more measurement devices and the one or more relay devices that are stored in the memory in association with the identification information of the terminal, and the server device generates a second report packet destined for a second relay device that was associated with the terminal before the updating processing is performed and is no longer associated with the terminal due to the updating processing being performed, the second report packet including a second list in which at least one measurement device of the one or more measurement devices that was associated with the terminal before the updating processing is performed is not included.

7. The communication system according to claim 6, wherein:

the server device transmits a third report packet to a third relay device associated with the terminal after the updating processing is performed, the third report packet including a third list in which a particular measurement device associated with the terminal after the updating processing is performed is included, and the third relay device associated with the terminal after the updating processing is performed relays a packet to the server device, the packet having been transmitted by the particular measurement device associated with the terminal after the updating processing is performed.

8. The communication system according to claim 6, wherein:

when the server device receives another change request that requests at least one change related to a particular measurement device that performs measurement to obtain measurement data that is used in the terminal, the server device updates, according to the another change request, a combination of the particular measurement device and a third relay device that are associated with the identification information of the terminal, and the server device generates a third report packet destined for the third relay device associated with the terminal, the third report packet including a third list in which the particular measurement device associated with the terminal after the updating is performed using the another change request is included.

9. A non-transitory computer-readable recording medium having stored therein a program that causes a server device to execute a process, the server device providing services to a terminal, the process comprising:

storing information indicating one or more measurement devices and information indicating one or more relay devices in association with identification information of the terminal, the one or more measurement devices performing one or more measurements to obtain measurement data that is used in the terminal, the one or more relay devices being able to relay the measurement data to the server device;

transmitting a first report packet to a first relay device associated with the identification information of the terminal when a request that the use of the services in the terminal be stopped is received, the first report packet including a first list in which the one or more measurement devices associated with the identification information of the terminal are not included, the first list being a report list of white listed measurement devices that are a transmission source of measurement data to be relayed by the first relay device; and transmitting a request to a second relay device that measurement data received by the second relay device not be relayed to the server device in response to the second relay device relaying only measurement data transmitted from measurement devices associated with the identification information of the terminal.

10. The recording medium according to claim 9, wherein the process further comprises:

performing, when a change request is received, processing of updating a combination of the one or more measurement devices and the one or more relay devices according to the change request, the one or more measurement devices and the one or more relay devices being stored in association with the identification information of the terminal, the change request requesting at least one change related to the one or more relay devices that are able to be used to use the services in the terminal, and transmitting a second report packet to a second relay device that was associated with the terminal before the updating processing is performed and is no longer associated with the terminal due to the updating processing being performed, the second report packet including a second list in which at least one measurement device of the one or more measurement devices that was associated with the terminal before the updating processing is performed is not included.

11. The recording medium according to claim 10, wherein:

the process further comprises transmitting a third report packet to a third relay device associated with the terminal after the updating processing is performed, so as to cause the third relay device newly associated with the terminal due to the updating processing being performed to relay a certain packet to the server device, the third report packet including a third list in which a particular measurement device associated with the terminal after the updating processing is performed is included, the certain packet having been transmitted by the third measurement device associated with the terminal after the updating processing is performed.

12. The recording medium according to claim 10, wherein the process further comprises:

updating, when another change request is received, a combination of a particular measurement device and a third relay device according to the another change request, the particular measurement device and the third relay device being associated with the identification information of the terminal, the another change request requesting at least one change related to the one or more measurement devices that perform measurements to obtain measurement data that is used in the terminal, and generating a third report packet destined for the third relay device associated with the terminal, the third report packet including a third list in which the particular measurement device associated with the terminal after the updating is performed using the another change request is included.

* * * * *